(12) United States Patent
Sreenivasa et al.

(10) Patent No.: US 11,445,415 B2
(45) Date of Patent: Sep. 13, 2022

(54) METHOD AND SYSTEM FOR CELL SELECTION AND RESELECTION WITH PRIORITIZATION

(71) Applicant: Samsung Electronics Co., Ltd., Suwon-si (KR)

(72) Inventors: Shreyas Sreenivasa, Bangalore (IN); Shanthossh Nagarajan, Bangalore (IN); Manasi Ekkundi, Bangalore (IN); Jajohn Mathew Mattam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/013,768

(22) Filed: Sep. 7, 2020

(65) Prior Publication Data

US 2021/0076270 A1 Mar. 11, 2021

(30) Foreign Application Priority Data

Sep. 6, 2019 (IN) .............................. 201941036057
Sep. 2, 2020 (IN) .............................. 201941036057

(51) Int. Cl.
*H04W 36/00* (2009.01)
*H04W 48/18* (2009.01)

(52) U.S. Cl.
CPC ... *H04W 36/0069* (2018.08); *H04W 36/0085* (2018.08); *H04W 36/00835* (2018.08); *H04W 48/18* (2013.01)

(58) Field of Classification Search
CPC ...... H04W 36/00; H04W 36/36; H04W 36/08
See application file for complete search history.

(56) References Cited

U.S. PATENT DOCUMENTS

| | | |
|---|---|---|
| 2008/0293419 A1 | 11/2008 | Somasundaram et al. |
| 2009/0069016 A1 | 3/2009 | Zhao |
| 2009/0088160 A1 | 4/2009 | Pani et al. |
| 2014/0334318 A1 | 11/2014 | Pica et al. |
| 2015/0296391 A1 | 10/2015 | Kotkar et al. |

(Continued)

FOREIGN PATENT DOCUMENTS

| | | |
|---|---|---|
| EP | 2574102 A2 | 3/2013 |
| JP | 2012010018 A | 1/2012 |

(Continued)

OTHER PUBLICATIONS

International Search Report of the International Searching Authority in connection with International Application No. PCT/KR2020/012057 dated Dec. 1, 2020, 3 pages.

Huawei, et al., "Distributing UEs to multiple carriers," R2-154623, 3GPP TSG-RAN WG2 #91bis, Malmo, Sweden, Oct. 5-9, 2015, 4 pages.

(Continued)

*Primary Examiner* — Michael T Vu

(57) ABSTRACT

The present subject matter refers a method of cell selection and reselection. The method comprises detecting a plurality of neighboring cells and their associated plurality of cell capabilities while the UE, having an associated UE capability, is connected to a serving cell. A possible throughput for the plurality of neighbouring cells is determined based on the detected plurality of cell capability and UE capability. A first neighboring cell is selected from the plurality of neighboring cells based on the determined possible throughput.

18 Claims, 22 Drawing Sheets

---

Detecting a plurality of neighboring cells and their associated plurality of Cell Capabilities — 502

Determining achievable throughput for the plurality of neighbouring cells based on the detected plurality of Cell Capability and UE Capability — 504

Selecting a first neighboring cell from the plurality of neighboring cells based on the determined achievable throughput — 506

(56) References Cited

U.S. PATENT DOCUMENTS

| | | | | |
|---|---|---|---|---|
| 2015/0327198 A1* | 11/2015 | Axmon | ............ | H04W 72/0453 370/336 |
| 2016/0050602 A1 | 2/2016 | Cui et al. | | |
| 2016/0353371 A1 | 12/2016 | Zhang et al. | | |
| 2017/0070931 A1* | 3/2017 | Huang | ............ | H04W 36/08 |
| 2017/0373731 A1* | 12/2017 | Guo | ............ | H04B 7/0404 |
| 2018/0035342 A1 | 2/2018 | Fujishiro et al. | | |
| 2018/0295527 A1 | 10/2018 | Guha et al. | | |

FOREIGN PATENT DOCUMENTS

| | | |
|---|---|---|
| JP | 6397994 B2 | 9/2018 |
| KR | 10-2016-0008580 A | 1/2016 |
| WO | 2015139666 A1 | 9/2015 |

OTHER PUBLICATIONS

Intelleclual Property India, "Examination report under sections 12 & 13 of the Patents Act" dated Jan. 7, 2022, in connection with Indian Patent Application No. 201941036057, 7 pages.

3GPP TS 25.306 V12.9 0 (Jun. 2017) Technical Specification; 3rd Generation Partnership Project; Technical Specification Group Radio Access Network; UE Radio Access capabilities (Release 12); 75 pages.

Ayman et al., "LTE and LTE-A Overview" Practical Guide to LTE-A, VoLTE and IoT Paving the Way Towards SG, First Edition, Jun. 5, 2018, 86 pages.

European Patent Office, "Supplementary European Search Report" dated Jun. 29, 2022, in connection with European Patent Application No. 20861079.0, 10 pages.

* cited by examiner

FIG. 1

| 5G | 05/08/19 12:26 | 374 | 26.8 | > |
| 5G | 05/08/19 12:18 | 385 | 24.8 | > |

FIG. 2

| | | | | |
|---|---|---|---|---|
| 5G | 05/08/19 12:17 | 473 | 22.5 | > |
| 5G | 05/08/19 12:14 | 513 | 23.2 | > |
| 5G | 05/08/19 12:13 | 474 | 23.7 | > |
| 5G | 05/08/19 12:10 | 463 | 23.9 | > |
| 5G | 05/08/19 12:00 | 460 | 28.0 | > |

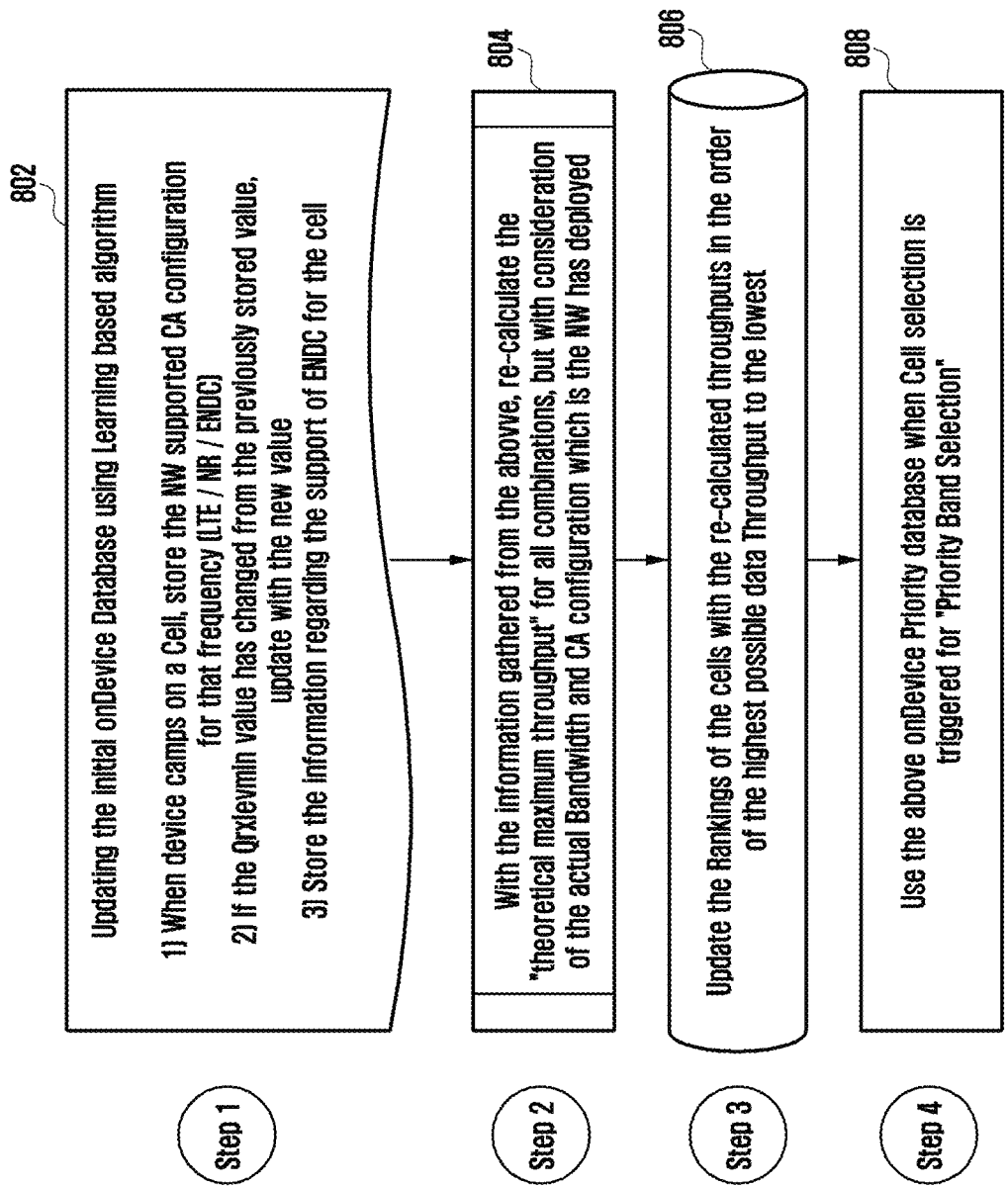

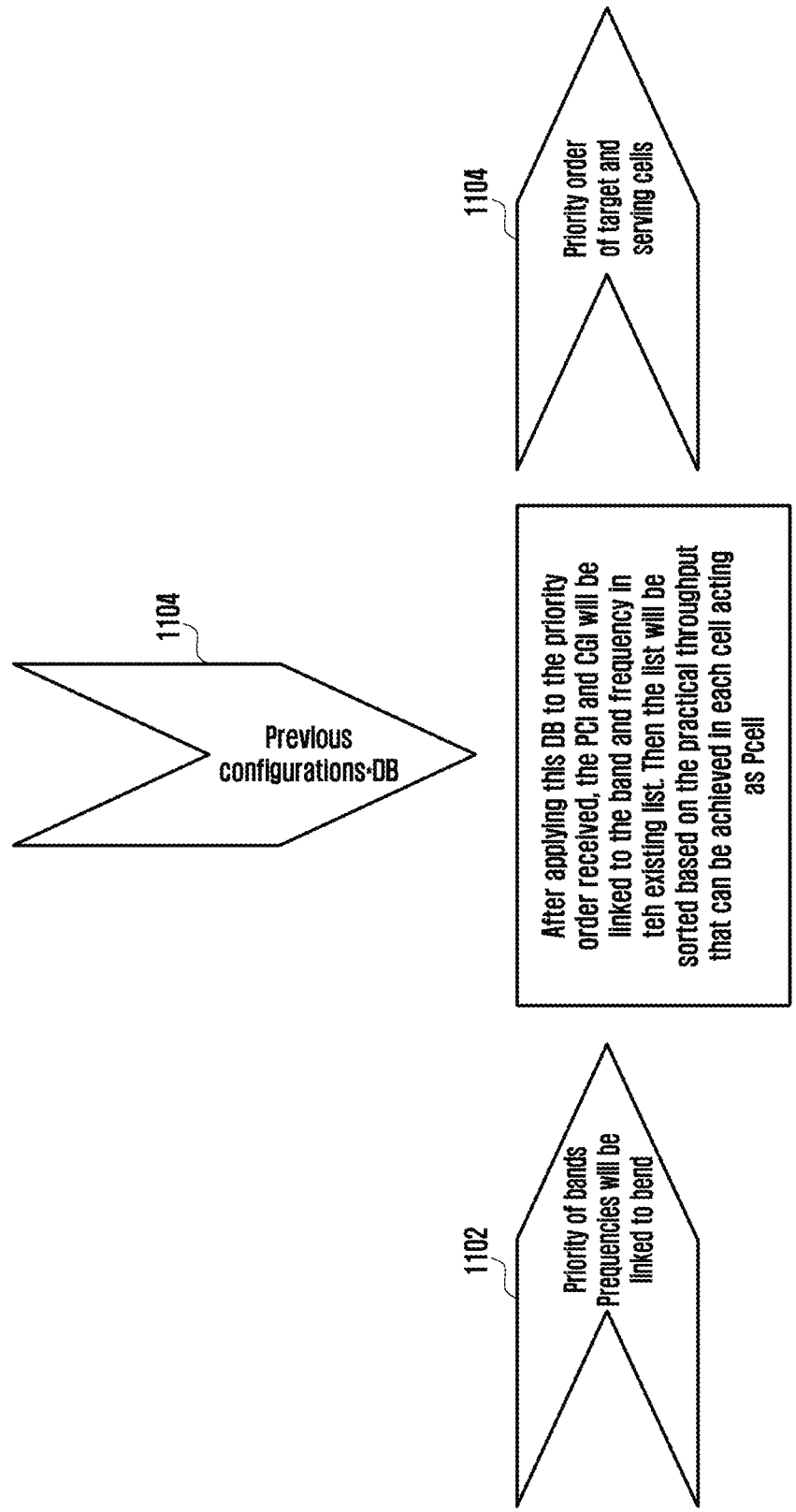

METHOD AND SYSTEM FOR CELL SELECTION AND RESELECTION WITH PRIORITIZATION

CROSS-REFERENCE TO RELATED APPLICATIONS

This application is based on and claims priority under 35 U.S.C. 119 to Indian Provisional Patent Application No. 201941036057, filed on Sep. 6, 2019 and Indian Complete Patent Application No. 201941036057, filed on Sep. 2, 2020 in the India Patent Office, the disclosure of which is incorporated by reference herein in its entirety.

BACKGROUND

1. Field

The present disclosure relates to wireless communication, specifically to mobile communication and more specifically related to a system and method for cell selection with band prioritization to achieve better data speed.

2. Description of Related Art

In the current scenario, during the idle mode cell selection, a User Equipment (UE) can have two options. One is initial cell selection which does not include any prior information to the UE. UE will scan all frequencies in any pre-defined order to find a cell which meets the cell selection criteria and camps on the cell. The other option is stored cell selection in which UE can use some prior information of previously camped cells to scan those frequencies first to check if any suitable cell is present or not and then if it does not find any suitable cell, it can proceed to the initial cell selection.

With current 3GPP specifications, UE after powered on, will perform either initial cell selection or stored cell selection based on some prior stored information. With existing implementations, there is no method to check the UE capabilities prior to doing a cell selection. With all major markets moving towards deploying 5G, it becomes all the more important to differentiate the services given.

With the current specification provision, the UE has two ways to do the idle mode cell selection—initial cell selection (blind) and stored cell selection (using previous camped cell info). With both the methods it cannot ensure that UE will camp on a cell which can potentially give a maximum data speed. In areas with overlapping bands where two or more bands have equally good cells to camp on, UE will tend to select the frequency which has the best energy to camp on, irrespective of other frequencies having similar energy. It turns out that it may not be the best possible approach. Because that cell which it finds first may not always provide the maximum data speed as per the UE capability whereas the other cell on the overlapping band which has equally good signal to camp on could have given a much higher data speed if only UE had prioritized this frequency during the cell selection process.

FIG. 1 illustrates an example case when the UE camped on LTE Band 20. Referring to the FIG. 1, a field example where the UE camped on LTE Band 20 is shown. Device does not support LTE (long term evolution) CA (carrier aggregation)+NR (new radio) in ENDC (EUTRA-NR dual connectivity) mode when camped on LTE Band 20 or LTE B20. So the shown data speed will be only from LTE leg, as NR leg cannot be supported.

FIG. 2 illustrates the example case when the UE camped on LTE Band 3 or LTE B3. Referring to the FIG. 2, a field example where the UE camped on LTE Band 3 at the same location is shown. Device can support LTE CA+NR in ENDC mode when camped on LTE B3. So the shown data speed will be from LTE leg and NR leg which can work in ENDC mode. Data speed gets better.

FIG. 3 illustrates the example case when the UE is in coverage of LTE Band 3 and LTE Band 20. Consider the case where the UE is in good coverage area of both LTE B3 and LTE B20 with LTE B3 being ENDC capable cell. When the UE wakes up, the UE tries to find energy on the frequencies present in the area. In this case, since the UE is closer to LTE B20 cell, the UE might find the energy of LTE B20 to be slightly better than B3. Even though S-criteria would have met for LTE B3 cell, the UE would try to camp on LTE B20 since the UE has better energy found. Once the UE camps on LTE B20, the UE will continue to be on LTE B20 unless there is no HO initiated from network (NW) side. Since its not ENDC capable cell, the data speed and the user experience will also get affected.

Consider the case where the UE is in good coverage area of both LTE B3 and LTE B20 and both being ENDC capable cell. In this case, the UE is capable of supporting LTE CA+NR in only LTE B3 but single LTE+NR in LTE B20 cell. When the UE wakes up, the UE tries to find energy on the frequencies present in the area. In this case, since the UE is closer to LTE B20 cell, the UE might find the energy of LTE B20 to be slightly better than LTE B3. Even though S-criteria would have met for LTE B3 cell, the UE would try to camp on LTE B20 since the UE has better energy found. Once it camps on LTE B20, the UE will continue to be on LTE B20 unless there is no HO initiated from NW side.

In other scenario, a cell change or selection can happen through a cell selection or a reselection or a handover. It is possible that a device support multiple LTE bands. During Cell Reselection and based on the priority defined by the network for each frequency, device will choose the most suitable cell and reselect. During Handover or connected mode mobility procedures, the network configures the measurement and based on the measurement report from the device, and the network send the handover command through which the device move to a new cell. In case of device which supports dual connectivity (DC), say ENDC, not all supported LTE bands can act as primary band in DC. Some of the bands may not be part of the ENDC combination as well.

Accordingly, if the device camps on to any such bands during cell selection or cell reselection or when in connected mode, it will restrict device/network to use/configure DC. This will restrict the device having better services/performance by using only LTE (no DC). Also, just by considering the priorities set by the NW or by the measurement configurations, it does not guarantee the best service and the maximum throughput.

Some of the problematic scenario-based examples are as follows:

Device does not camp (during cell selection) to any of the anchor bands in LTE and hence NR addition is not possible.

Device is reselecting to non-anchor bands in idle mode and hence when there is data transfer, NR addition is not possible.

During data transfer, the device is handed over to a LTE cell which cannot act as anchor band and hence NR is removed.

The afore-described state of the art cell selection and reselection in Idle mode and measurement mechanism in connected mode refer that the UE remains deprived from a control for selecting or changing the cell based on the ENDC support. If the device is in any cell which belongs to a band which cannot act as the anchor band for ENDC, then this will restrict the device from having the benefits and services of ENDC.

ENDC device can perform better when compared to a LTE only device in terms of performance and services. A device may support multiple LTE bands but these LTE bands may not belong to any of the ENDC combinations as primary band. If a device reselects or get handover to any of the cells which belong to these bands, device will not get the similar performance which gets when the device is in a cell which can support ENDC.

SUMMARY

This summary is provided to introduce a selection of concepts in a simplified format that is further described in the detailed description of the present disclosure. This summary is not intended to identify key or essential inventive concepts of the claimed subject matter, nor is it intended for determining the scope of the claimed subject matter.

The present subject matter refers a method of cell selection and reselection. The method comprises detecting a plurality of neighboring cells and their associated plurality of Cell Capabilities while the UE, having an associated UE capability, is connected to a serving cell. A possible throughput for the plurality of neighboring cells is determined based on the detected plurality of Cell Capability and UE Capability. A first neighboring cell is selected from the plurality of neighboring cells based on the determined possible throughput.

The present subject matter refers a method implemented for a device to select cells in various modes of operation. The method comprises determining within a network at-least one of: a device capability, details with respect to one or more serving cells and one or more target-cell; and historical configurations for said one or more serving and target cell. Thereafter, a list of ranked-cells based on said determination, wherein said cells are defined as at-least one of: a) one or more cells in Dual connectivity (DC) configuration adjudicated as primary cells and meeting a selection criteria, b) one or more cells in Dual connectivity (DC) configuration adjudicated as primary cells and current undergoing the selection criteria, c) one or more bands in respect of NR network defining different-bands in respect of LTE carrier aggregation (CA), d) one or more bands in respect of standalone NR network, and e) one or more bands in respect of standalone LTE network.

In other example, the present subject matter renders a method implemented for a device to select cells based on band prioritization. The method comprises preparing a set of bands supported along-with the bandwidth defined by at least one of: LTE, NR, MRDC (multi-radio dual connectivity), NRDC (NR-NR dual connectivity) and Legacy Radio access networks. A list of plurality of CA combinations is prepared, wherein said combinations are derivable from the bandwidths defined by the LTE, NR, MRDC, NRDC and Legacy Radio access networks. The same enables calculation of the achievable data rate with respect to each of said combination based on the bandwidth supported by the device to enable a ranking of the list. Achievable data rate for each combination is updated based on the bandwidth and CA configuration deployed by the network when the device camps on cell. Thereafter, ranking associated with the list is updated based on said updated achievable data rate.

To further clarify the advantages and features of the present disclosure, a more particular description of the present disclosure will be rendered by reference to specific embodiments thereof, which is illustrated in the appended drawings. It is appreciated that these drawings depict only typical embodiments of the present disclosure and are therefore not to be considered limiting of its scope. The present disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1 to 3 illustrate a state of the art scenario;

FIG. 8 illustrates method steps, in accordance with the embodiment of the present disclosure;

FIGS. 14A and 14B illustrate a second stage ranking, in accordance with the embodiment of the present disclosure;

Figure 3:
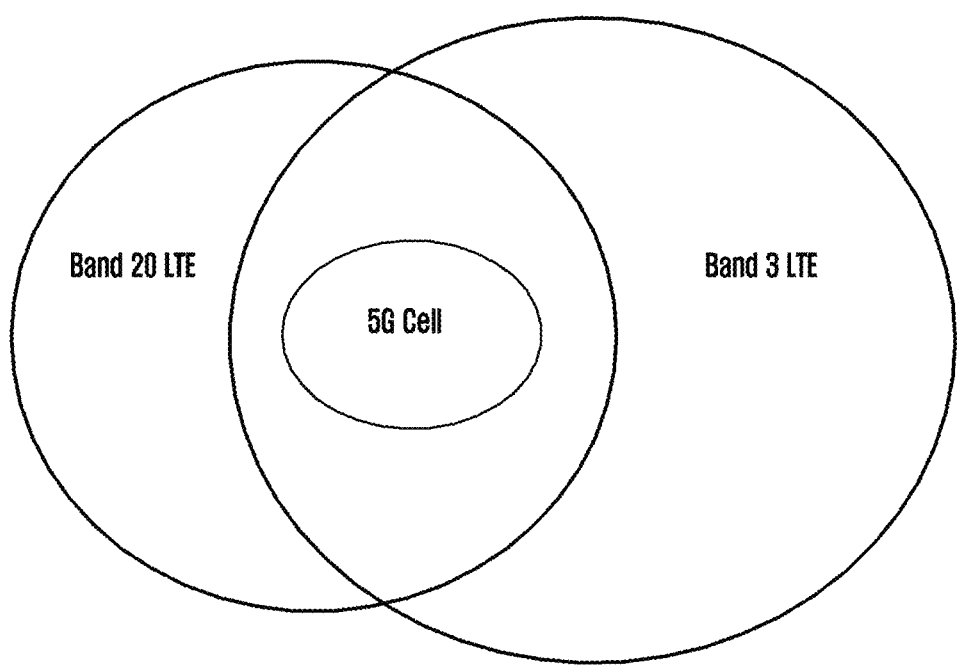

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Accordingly, embodiments herein disclose a system and method for cell selection with band prioritization to achieve better data speed. Further, the method includes providing a method during the cell selection process so that the UE should be able to prioritize the band scanning based on the UE capability of the device, aided by learning based techniques, to ensure that device camps on cell with maximum data speed capability for mobile phones capable of supporting carrier aggregation (CA) or dual connectivity (DC) or both CA and DC. Further, the method includes providing a method in which when the UE is redirected by the network to a Radio Access Technology (RAT) which supports carrier aggregation (CA) 10 or Dual connectivity (DC) or both CA and DC, UE will do a prioritized band scanning based on the UE capability to support maximum data speed on a particular band instead of doing a blind scan. Further, the method includes ensuring that the UE will find a cell first belonging to a band which can according to the UE capability gives the maximum possible data speed. Further, the method includes de-prioritizing a cell which may not be able to give maximum data speed according the UE capabilities.

The proposed method is intended to prioritise the order in which the band scanning takes place by utilising the UE capability instead of doing a normal blind scan. This is to ensure that UE camps on cell on which 20 it can get maximum data speed. Since the fifth generation (5G) New Radio (NR) in EUTRA NR Dual connectivity (ENDC) (ENDC—anchor is Long Term Evolution (LTE) legacy cell. 5G NR cell is added as secondary cell) mode is being deployed in phases by every operator in the whole market, UE may not be supporting carrier aggregation on all the different bands which the UE supports. With this limitation from the device side, the way differentiating as a UE vendor is to ensure that the device will maximize the possibility to camp on a cell belonging to particular band which can give us the best possible data speed in that area. The proposed present disclosure will be applicable to any hand held mobile device which support LTE or 5G NR (New Radio) technology or both LTE and 5G NR.

The proposed solution at least aims to provide a better quality of service to the users by ensuring that a user will camp on a cell which can potentially give the maximum data speed to that user. The proposed solution is following all the 3GPP laid down procedures but using the leeway provided in the stored cell selection, using methods for utilising the device side capabilities and learning methods to make an intelligent ranking to prioritise bands which give a higher data speed and QOS (quality of service).

According to the proposed method, before the UE proceeds to do cell selection, the UE will check its on device priority database to find if the available frequencies it has found are part of the database or not. The on device priority database is constantly updated database having a ordered list of frequencies based on multiple parameters, not limited to the UE capability support, NW deployment etc. Based on the rankings from the database, device uses the above ordered list to find suitable cells in each band to camp on.

Figure 4:
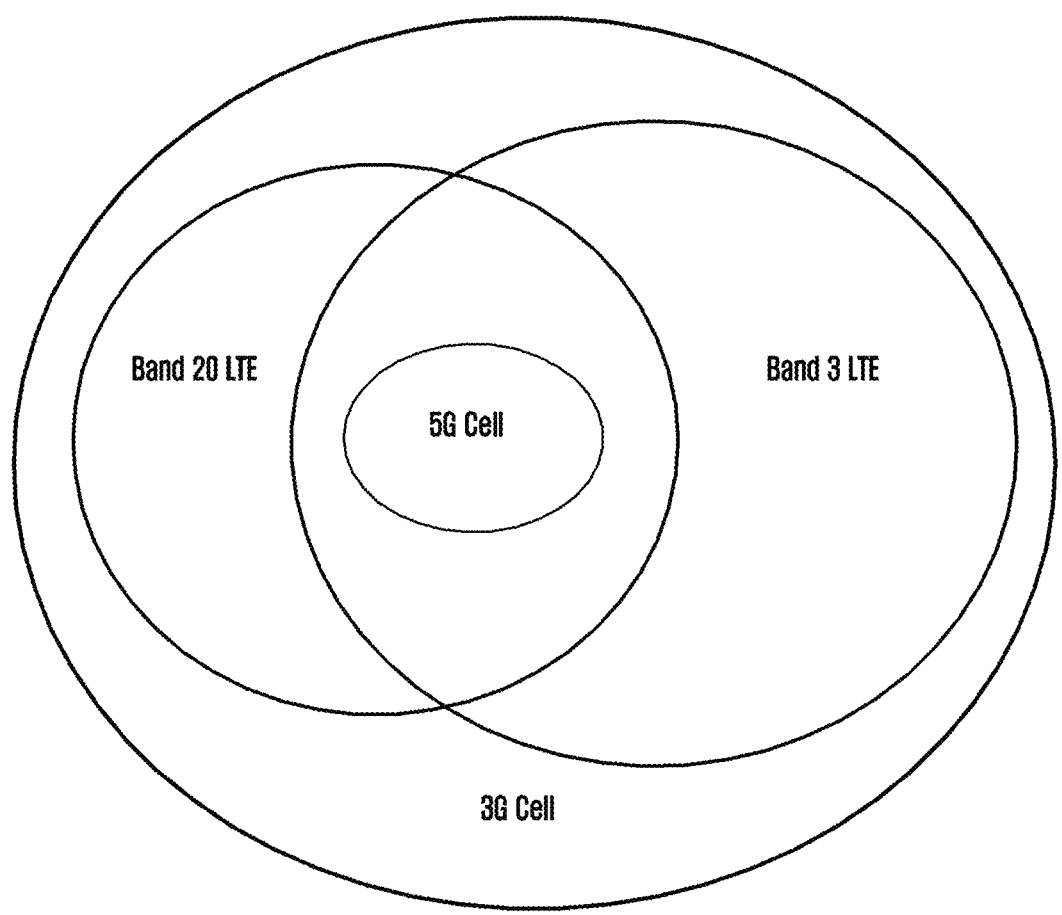
FIG. 4 illustrates the example case when the UE is in coverage of Band 3, in accordance with an embodiment of the present subject matter.
Figure 5:
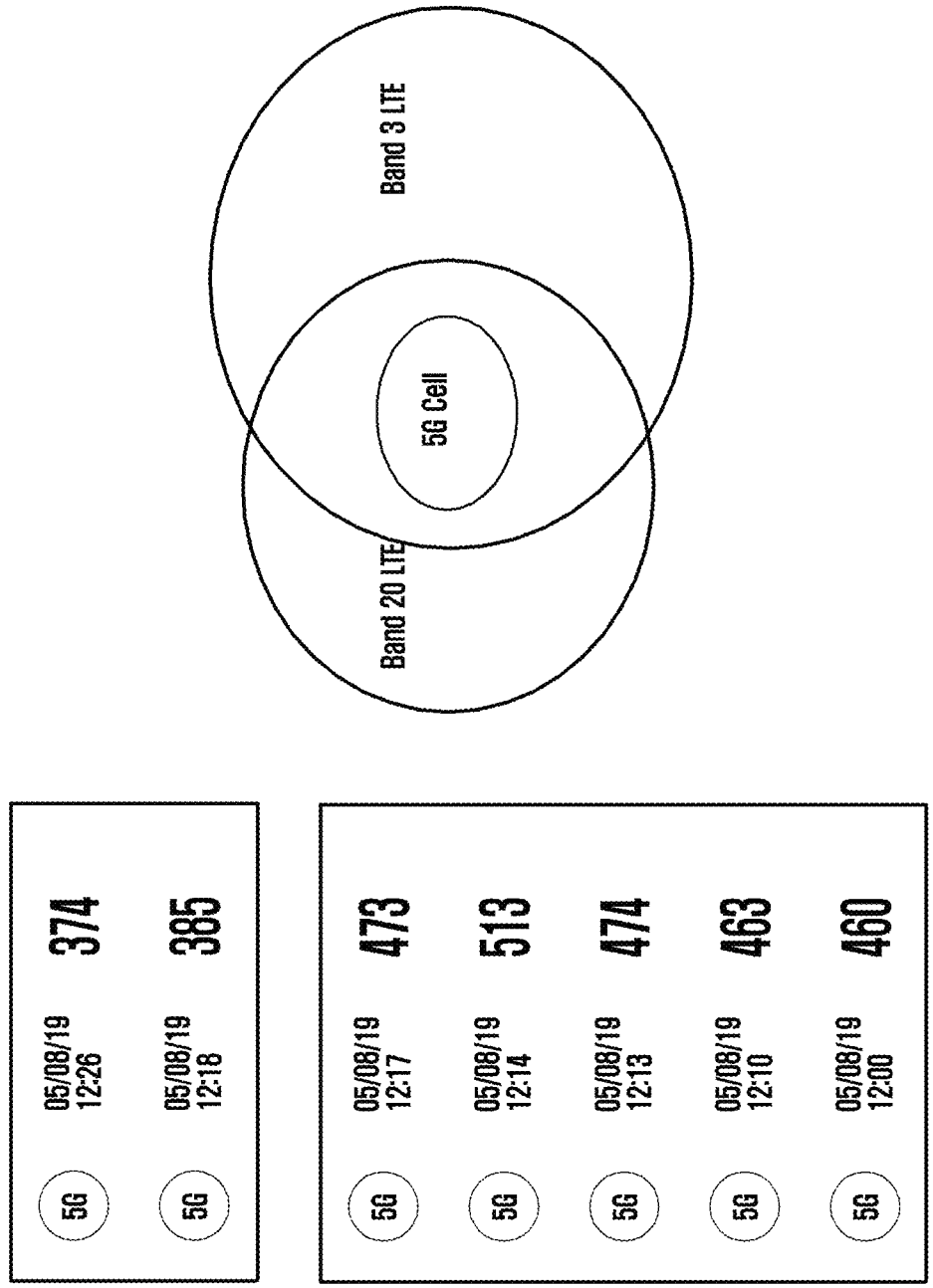
FIG. 5 illustrates the example use case showing the comparison of speed test data speed results in accordance with an embodiment of the present subject matter.

With the proposed solution at least as referred in FIG. 4 and FIG. 5, UE would rank B3 to be higher priority cell since the UE is capable of providing a higher data speed and the UE would try to select B3 cell first.

FIG. 4 illustrates the example case when the UE is in coverage of LTE Band 3 ("B3") and LTE Band 20 ("B20") and in 3G coverage area. Referring to the FIG. 4, consider the case where the UE is in good coverage area of both LTE B3 and LTE B20 with B3 being ENDC capable cell. Initially the UE was camped on LTE Band 3 cell and NR cell was added. Later CSFB (circuit switched fall back) call was initiated and the UE camped on 3G cell in the same area and made the CSFB Call. Once the call was released, NW gave RRC (radio resource control) connection release with redirection info containing both LTE B3 and LTE B20 EARFCN. If the UE finds energy on LTE Band 20 to be slightly better than LTE Band 3, the UE will try to camp on LTE Band 20. The present subject matter utilizes the prior information of LTE Band 3 being ENDC capable and if the energy of LTE B3 cell is able to meet S-criteria, the UE will try to camp on it instead of LTE B20 cell due to a better rank awarded to B3 cell.

FIG. 5 illustrates the example use case based on a proposed method showing the comparison of speed test data speed results. In the proposed solution, there should be a method by which the UE has to prioritize the band the UE should camp to, which would be based on the UE capability. In the case shown in the FIG. 5, the UE should consider LTE B3 (LTE CA+ENDC) and ranks LTE B3 better than LTE B20 (either only LTE CA or LTE single cell+ENDC). During a decision of cell selection, LTE B3 shall be prioritized and scanned before LTE B20 as shown in FIG. 5 due to the higher bandwidth.

Figure 6:
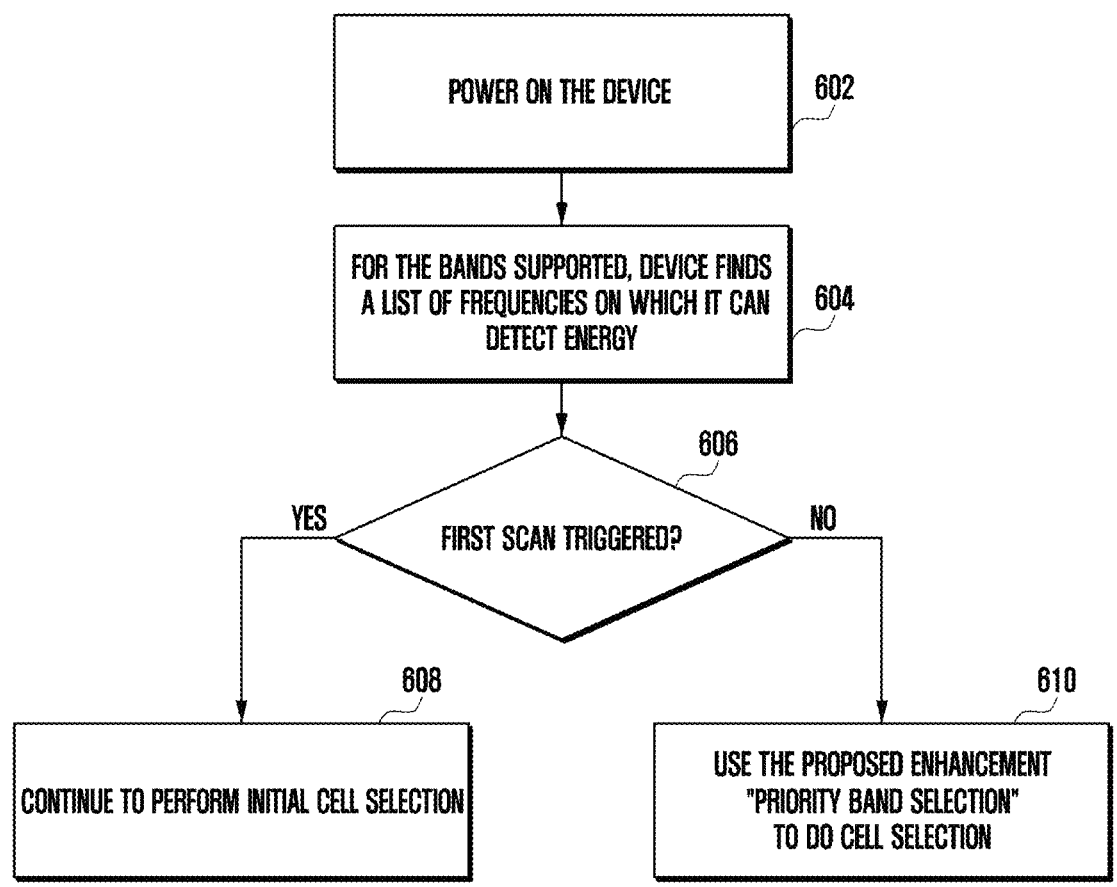
FIG. 6 illustrates the initial setup based on the proposed method in accordance with an embodiment of the present subject matter.

FIG. 6 illustrates the initial setup based on the proposed method according to an embodiment as disclosed herein. Upon switching ON of the device at Step 602, the device finds the list of frequencies upon which it may detect energy through step 604, wherein said frequencies relate to the supported bands. Accordingly, a band-scan for scanning bands is triggered by the device. In case of the triggering of the first scan vide step 606 (e.g. after device reset when the device does not have historical records of past scanned bands), the usual cell reselection may be performed vide step 608. Else, the priority band selection based on prioritized band scanning is performed vide step 610 to enable cell reselection in accordance with the incoming FIGS. 7A and 7B.

Figure 7A:
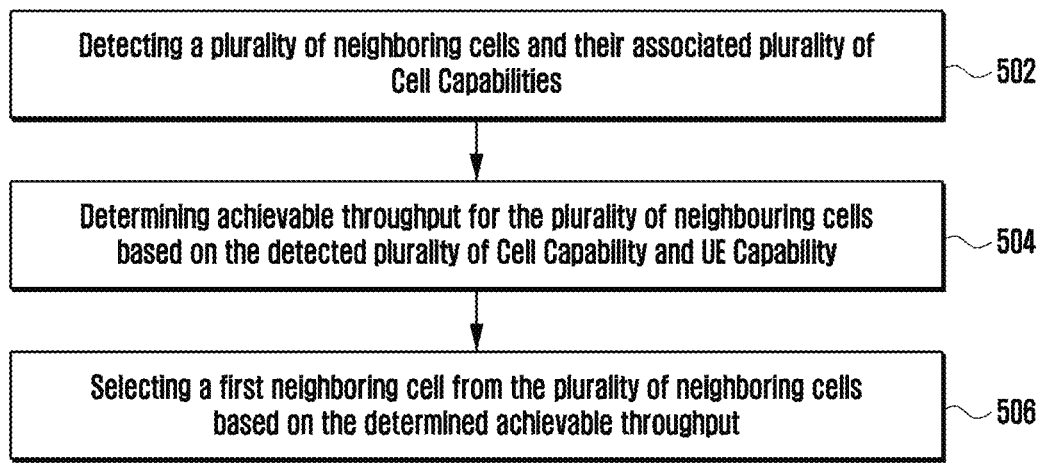
FIGS. 7A and 7B illustrate method steps, in accordance with the embodiment of the present disclosure.

FIG. 7A illustrates proposed method of cell selection and reselection according to an embodiment as disclosed herein.

At step 502, the method comprises detecting a plurality of neighboring cells and their associated plurality of Cell Capabilities while the UE, having an associated UE capability, is connected to a serving cell.

At step 504, the method comprises determining an achievable throughput for the plurality of neighboring cells based on the detected plurality of Cell Capability and UE Capability. The determination of an achievable throughput for the plurality of neighboring cells based on the detected plurality of Cell Capability and UE Capability includes one or more of:

a) checking a Throughput Database for the achievable throughput of the plurality of neighboring cells, wherein the Throughput Database is managed by at least one of the UE, a cloud server and a network entity.

b) identifying a first neighboring cell from the plurality of neighboring cells based on the checked achievable throughput of the plurality of neighboring cells; and c) sending a request to connect to the first neighboring cell.

In an implementation, managing the Throughput Database comprises receiving, over a period of time, achievable throughput of a plurality of cells and associated Cell Capabilities of the plurality of cells wherein the UE has connected to the plurality of cells over the period of time; and storing the received achievable throughput of a plurality of cells and associated Cell Capabilities of the plurality of cells in a database. In an implementation, the plurality of cells that are ranked comprises cells defined as at least one of:

one or more cells in Dual connectivity (DC) configuration adjudicated as primary cells and meeting a selection criteria;

one or more cells in Dual connectivity (DC) configuration adjudicated as primary cells and current undergoing the selection criteria;

one or more bands in respect of NR network defining different bands in respect of LTE carrier aggregation (CA);

one or more bands in respect of standalone NR network; and one or more bands in respect of standalone LTE network.

In an implementation, the Cell Capability includes at least one of Dual Connectivity Configuration, Standalone configuration, supported Carrier Aggregation Configurations, supported Bands, list of frequencies assigned to the supported Bands and supported bandwidth parts.

In an implementation, the UE Capability includes at least one of Dual Connectivity Configuration of the UE, Standalone configuration of the UE, Carrier Aggregation Configurations supported by the UE, Frequency Bands supported by the UE, and bandwidth parts supported by the UE.

Further the method comprises selecting (step 506) a first neighboring cell is selected from the plurality of neighboring cells based on the determined achievable throughput. The selecting of the first neighboring cell comprises pursuing a cell selection process when device is not in camped state or has been redirected by the network, said pursuing defined by the steps of exploring a plurality of cells based on energy detection as a part of cell-selection process; mapping the plurality of explored cells with the cells mentioned in the Throughput Database defining the ranking; and selecting the first neighboring cell based on the mapped cells for cell selection, said mapped cells corresponding to the explored cells defined by one or more frequencies fulfilling a predetermined inequality criteria.

In an example, the exploration of cells performed by the UE denotes performing measurement of neighbour cells to receive neighbor base station (BS) information for the purpose of switching to a potential target BS (for Redirection & Handover). Alternatively, the exploration of cells may be referred as scanning of neighbor base stations (BS).

In an implementation, the mapping comprises:

mapping the plurality of explored cells linked with one or more detected frequencies with the cells in the throughput database checking if the one or more detected frequencies in the are linked or associated to the throughput database;

enabling cell selection in respect of the one or more detected frequencies based on said checking.

Figure 7B:
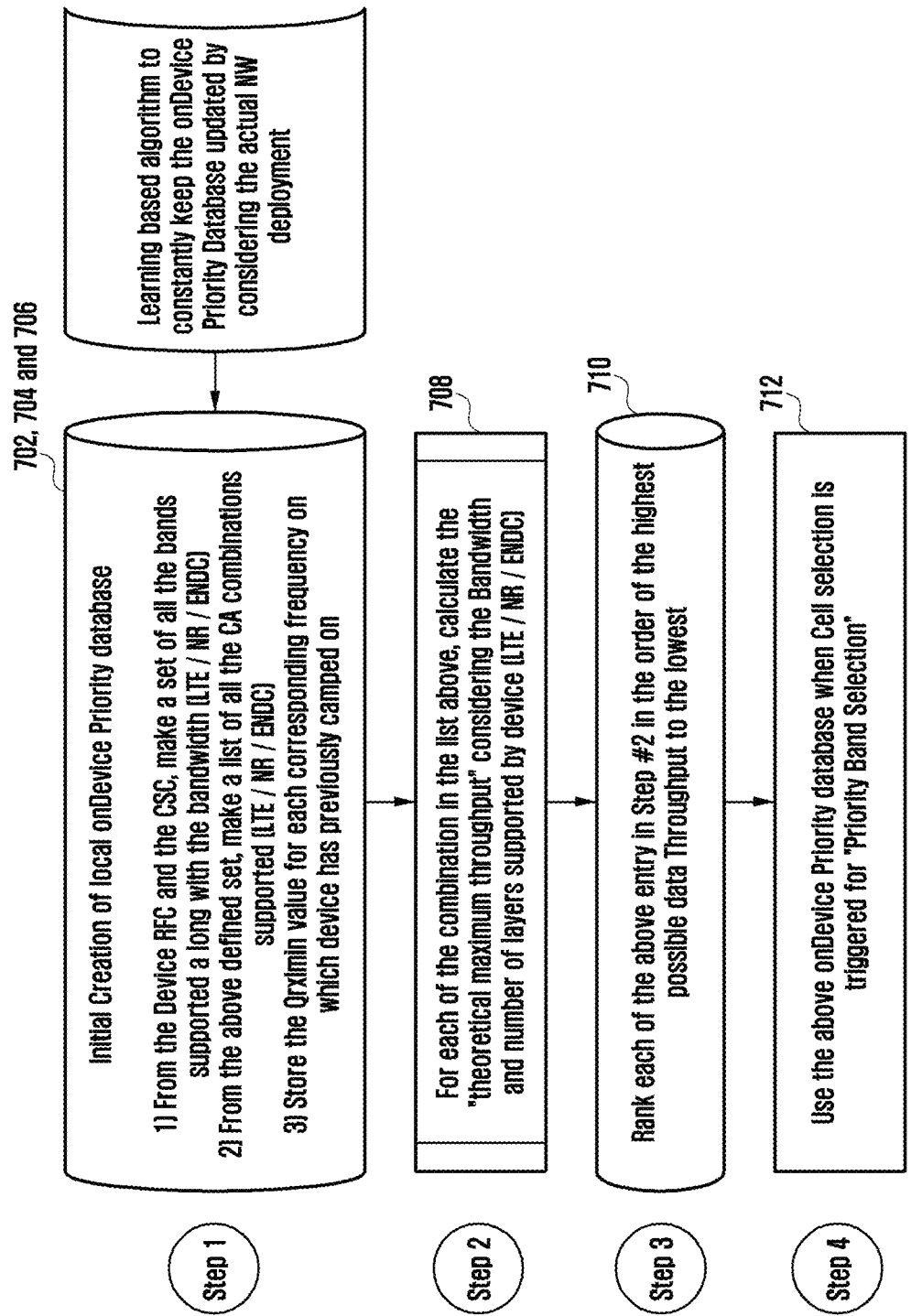

FIG. 7B illustrates creation of on device priority database, interchangeably referred as throughput database, based on the proposed method according to an embodiment as disclosed herein. More specifically, the present figure illustrates the method implemented for ranking the plurality of serving cells stored in the Throughput Database based on which the device selects cells based on band-prioritization.

At step 702, a set of bands supported along-with the bandwidth is determined by the device. The bandwidth may be defined in respect of serving cell determined from the plurality of serving cells and specifically in accordance with at least one of: LTE, NR, MRDC, NRDC and Legacy Radio access networks. The set may be prepared based on the device hardware and software configurations.

At step 704, the method comprises identifying a list of a plurality of carrier aggregation (CA) combinations based on bandwidth & frequency for the at least one serving cell from the plurality of serving cells. More importantly, the CA combinations supported from the bandwidths are defined by the LTE, NR, MRDC, NRDC and Legacy Radio access networks is prepared.

At step 706, q-RxLevMin value for each frequency previously camped by device is stored. q-RxLevMin is used to indicate for cell re-selection the required minimum received RSRP level in EUTRA.

Based on steps 702-706, an initial on device priority database for bands is created for being locally stored upon the device.

At step 708, the method comprises calculating the achievable throughput or an achievable data rate with respect to each of said combination based on the bandwidth supported by the device. The achievable data rate denotes the "theoretical maximum throughput" based on the bandwidth and number of layers (LTE, NR, MRDC, NRDC) as supported by the device.

At step 710, the entries in the list created in step 708 are ranked form high to low or vice versa to thereby yield an on-device database having a prioritized band list.

At step 712, the on device as created in step is deployed for prioritized band scanning to enable cell reselection whenever the prioritized band scanning in triggered in accordance with FIG. 6.

FIG. 8 illustrates updating of Throughput database, interchangeably referred as on-device priority database, based on the proposed method according to an embodiment as disclosed herein.

Step 802 corresponds to step 702 and step 704 of FIG. 7B. At step 802, when the device camps on a cell a list of a plurality of carrier aggregation (CA) combinations (forming a part of on-device priority database) supported from the bandwidths defined by the LTE, NR, MRDC, NRDC and Legacy Radio access networks is again prepared. Accordingly, any variation in q-RxLevMin value for each frequency previously camped by device is noted and q-RxLevMin value is updated with a current value. In addition, with respect to the current camped cell, support for ENDC is noted.

Step 804 corresponds to step 706. Here, the achievable data rate for each combination is updated based on the bandwidth and CA configuration deployed by the network when the device camps on cell. In other words, based on the updates observed in step 802, "the theoretical maximum throughput" as achieved based on the bandwidth and number of layers (LTE, NR, MRDC, NRDC) is recalculated for all CA combination and in respect of the actual bandwidth and CA configuration which the network has deployed in respect of the current camped cell.

At step 806, the entries in the list created in step 804 are ranked form high to low or vice versa to thereby yield an on-device database having an updated prioritized band list. In other words, the ranking of step 710 associated with the list is updated based on said updated achievable data rate.

In an example, the Steps 802 till 806 may be executed by machine learning to continuously update the prioritized band list in the on-device database as created in FIG. 7. The basis for said update may be measurements done by the device when the device actually camps on various cell as a part of actual network deployment.

At step 808, the on-device as created in step is deployed for prioritized band scanning to enable cell reselection whenever the prioritized band scanning in triggered in accordance with FIG. 6.

Figure 9:
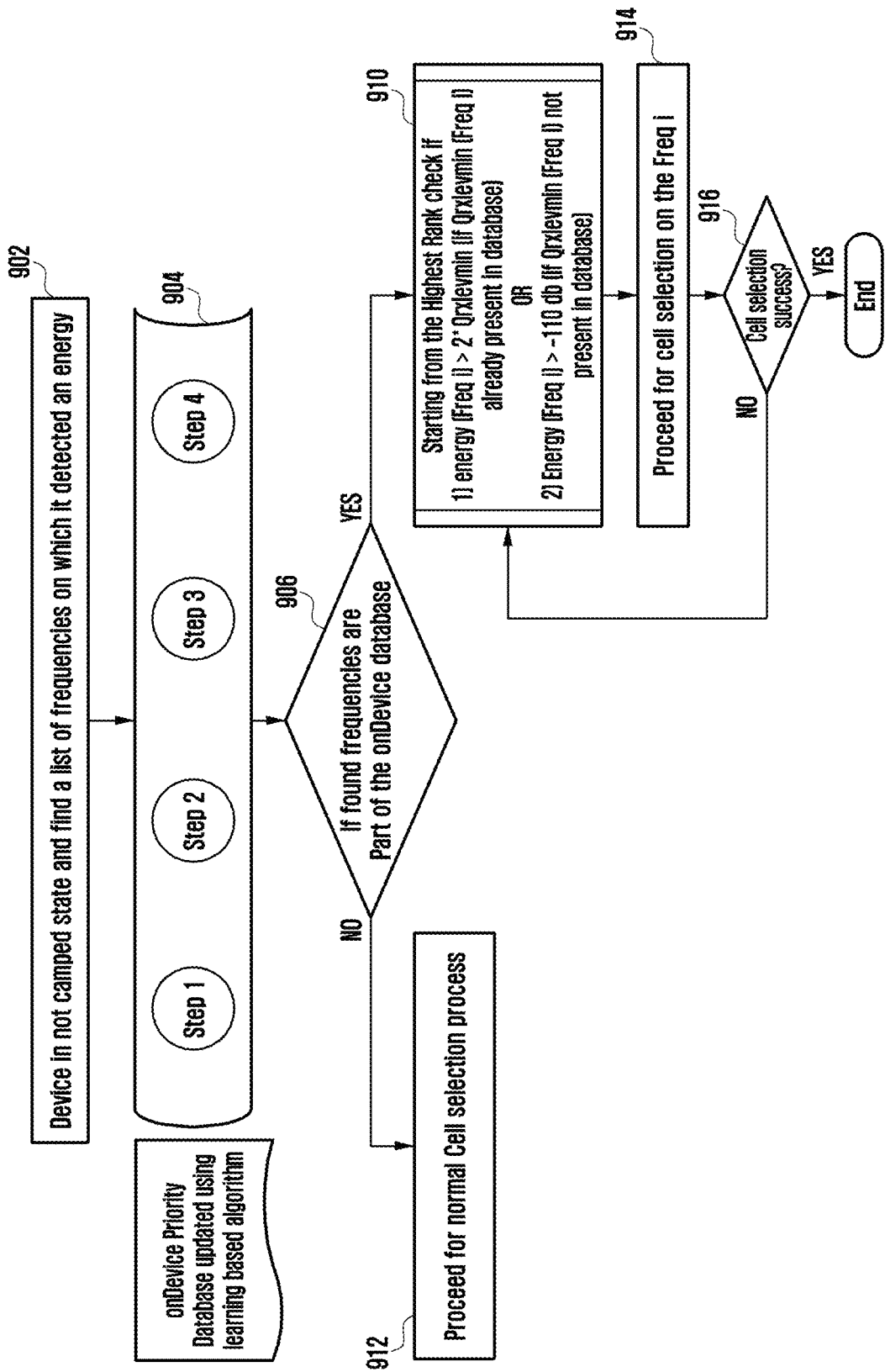
FIG. 9 illustrates method steps, in accordance with the embodiment of the present disclosure.

FIG. 9 illustrates cell selection when device is not in camped state based on the proposed method according to an embodiment as disclosed herein.

At step 902, energies are detected on a set of frequencies during the course of performing a cell reselection. It is also detected that device is not in camped state. Accordingly, exploration of a plurality of cells is triggered based on energy detection as a part of cell-selection process.

At step 904, the updating of on-device database in accordance with FIG. 8 is executed.

At step 906, the plurality of explored cells linked with the detected frequencies are mapped with the cells associated with the list within the updated on device database of step 904. It is checked if the detected frequencies in the step 902 are linked or associated to the on Device database. If yes, then the control flow transfer to step 910. Else, the control flow is transferred to step 912 wherein a normal cell-reselection process is pursued.

At step 910, the on device database of step 906 is traversed from top-ranked to low-ranked bands. If the current detected frequency (say frequency i) is indeed present within the database then it is checked if following inequality criteria is addressed:

Energy(Freq$i$)>2$q$-RxLev Min(Freq$i$), if $q$-RxLev Min (Freq$i$) present in database If the current detected frequency (say frequency i) is not present within the database then it is checked if following inequality criteria is addressed.

Energy(Freq$i$)>−110db, if $q$-RxLevMin(Freq$i$) is not present in database

At step 914 if either of the inequality criteria is met, then cell selection is performed on the Freq i.

At step 916, if cell selection is success then the process terminates. Otherwise, in case of no success, then the another frequency i lower in the hierarchy is selected for executing step 910 to thereby again attempt cell-selection.

Figure 10:
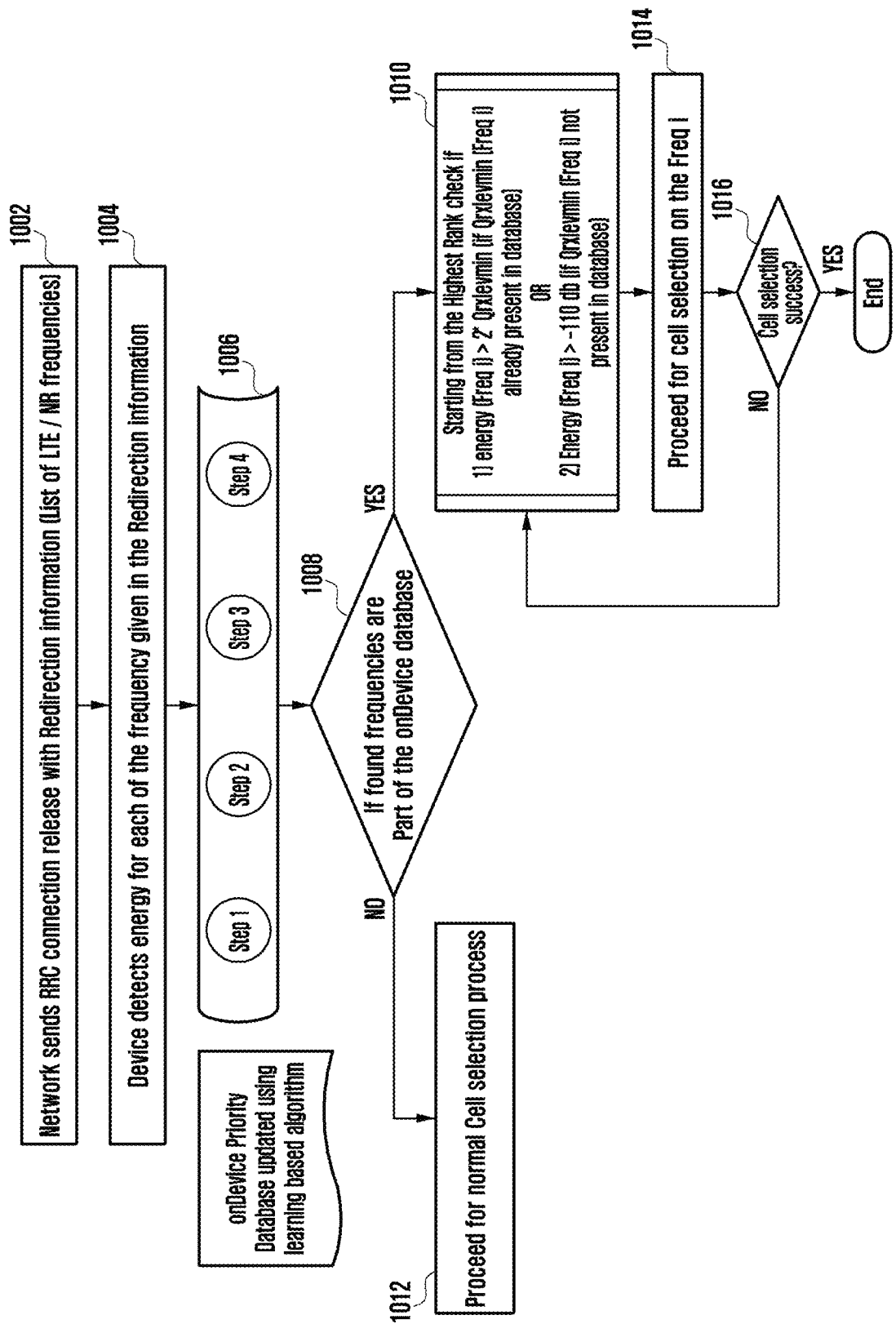
FIG. 10 illustrates method steps, in accordance with the embodiment of the present disclosure.

FIG. 10 illustrates cell selection when device is given redirection from network based on the proposed method according to an embodiment as disclosed herein.

At step 1002, a cell selection process is pursued when device is redirected by the network and accordingly the network sends an RRC connection release request.

At step 1004, energies are detected on a set of frequencies within the RRC release request.

Rest of the steps 1006, 1008, 1010, 1012, 1014 and 1016 correspond to the steps 904, 906, 910, 912 and 914, respectively.

At least advantages of the preferred embodiment are: better data speed and QoS compared to state of the art devices, making use of available bandwidth to the fullest and making sure that even if the UE will have some restrictions on certain conditions, those restrictions and their effects can be minimalized.

In an example of the field issue, the LTE Band 20 and LTE Band 3 both were having good signal, with LTE B20 having slightly better energy and UE camped on LTE Band 20 and stayed in connected mode for close to 100 s. Later once it moved to idle mode again, it did high priority-based reselection to LTE Band 3 cell. In this case, Band 20 does not support LTE CA+NR as per UE capabilities. But Band 3 does. Hence the tester saw CA was not getting activated while on LTE Band 20 and throughput also was lower. If the proposed solution is implemented, UE will rank LTE Band 3 to be higher ranked than Band 10 based on the maximum data speed capabilities and will instead attempt to camp on band 3 cell first. In the end, the user will get a consistently higher data speed than with the current solution.

In another example it is observed that initially device was on LTE B3 and NR was added. CSFB call was initiated and UE did ESR and camped on a 3G cell. CSFB call was finished and then UE received RRC connection release with redirection info carrying frequency corresponding to both LTE B3 and LTE B20. UE found good energy on both the frequency with LTE B20 frequency being higher and immediately camped on LTE B20 cell. But LTE B20 cell is not ENDC capable and UE was stuck in 4G only. With the proposed solution, LTE B3 would be ranked higher since UE knows it is ENDC capable (due to prior camping) and then it will attempt to camp on the LTE B3 cell first. The proposed solution will ensure that the User will get back to 5G immediately after cell ended.

Figure 11:
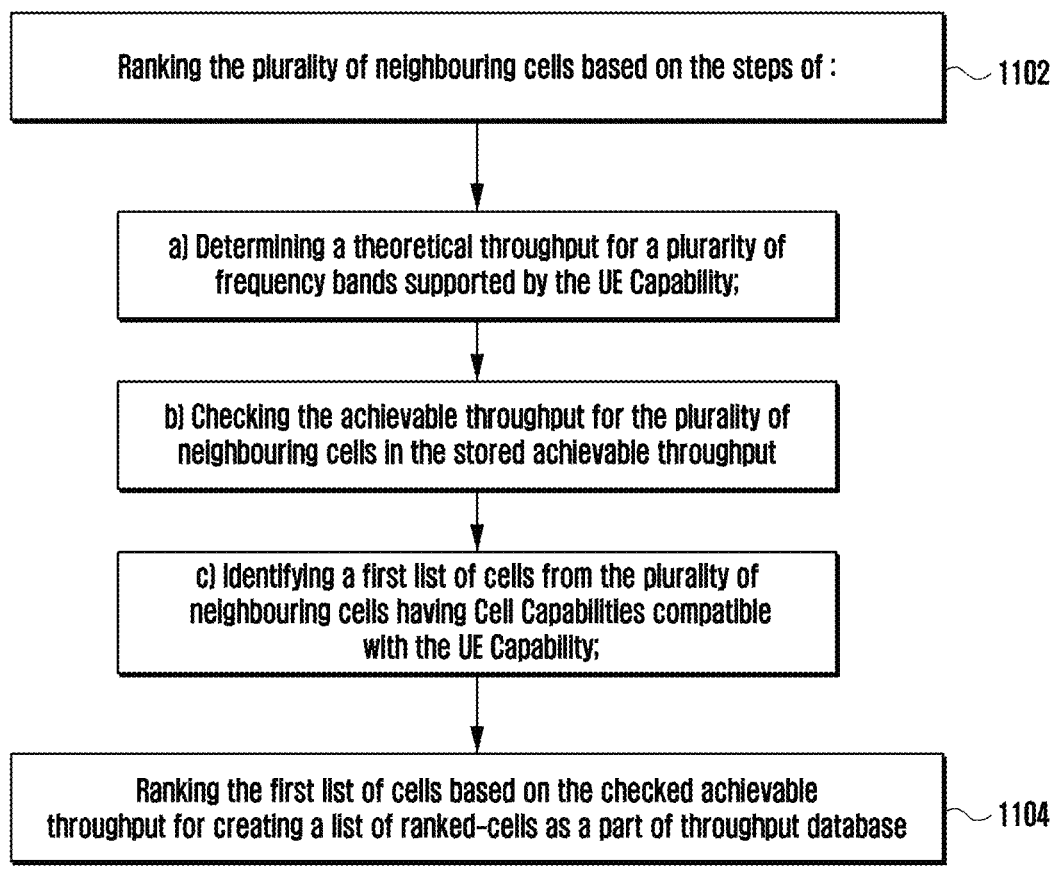
FIG. 11 illustrates method steps, in accordance with the embodiment of the present disclosure.

FIG. 11 illustrates a method implemented for a device to select cells in various modes (reselection or connected) of operation.

At step 1102, the method comprises the ranking of the plurality of neighboring cells is based on the steps of:

a) Determining (1102a) a theoretical throughput for a plurality of frequency bands supported by the UE Capability;

b) Checking (1102b) the achievable throughput for the plurality of neighboring cells in the stored achievable throughput of the plurality of cell in the Throughput Database; and c) Identifying (1102c) a first list of cells from the plurality of neighboring cells having Cell Capabilities compatible with the UE Capability.

In an example, at least one neighboring cell compatible with the UE capability and having higher achievable throughput is ranked higher than the other cells from the plurality of neighboring cells compatible with UE capability and having lower achievable throughput.

In an example, step 1102 may denote determining within a network at-least one of a device capability; details with respect to one or more serving cells and one or more target-cell; and historical configurations for said one or more serving and target cell.

At step 1104, a list of ranked cells is created as part of the throughput database based on said determination. The first list of cells is ranked based on the checked achievable throughput.

The cells is the list may be defined as at least one of: one or more cells in Dual connectivity (DC) configuration adjudicated as primary cells and meeting a selection criteria, one or more cells in Dual connectivity (DC) configuration adjudicated as primary cells and current undergoing the selection criteria, one or more bands in respect of NR network defining different-bands in respect of LTE carrier aggregation (CA), one or more bands in respect of standalone NR network, and one or more bands in respect of standalone LTE network.

Figure 12:
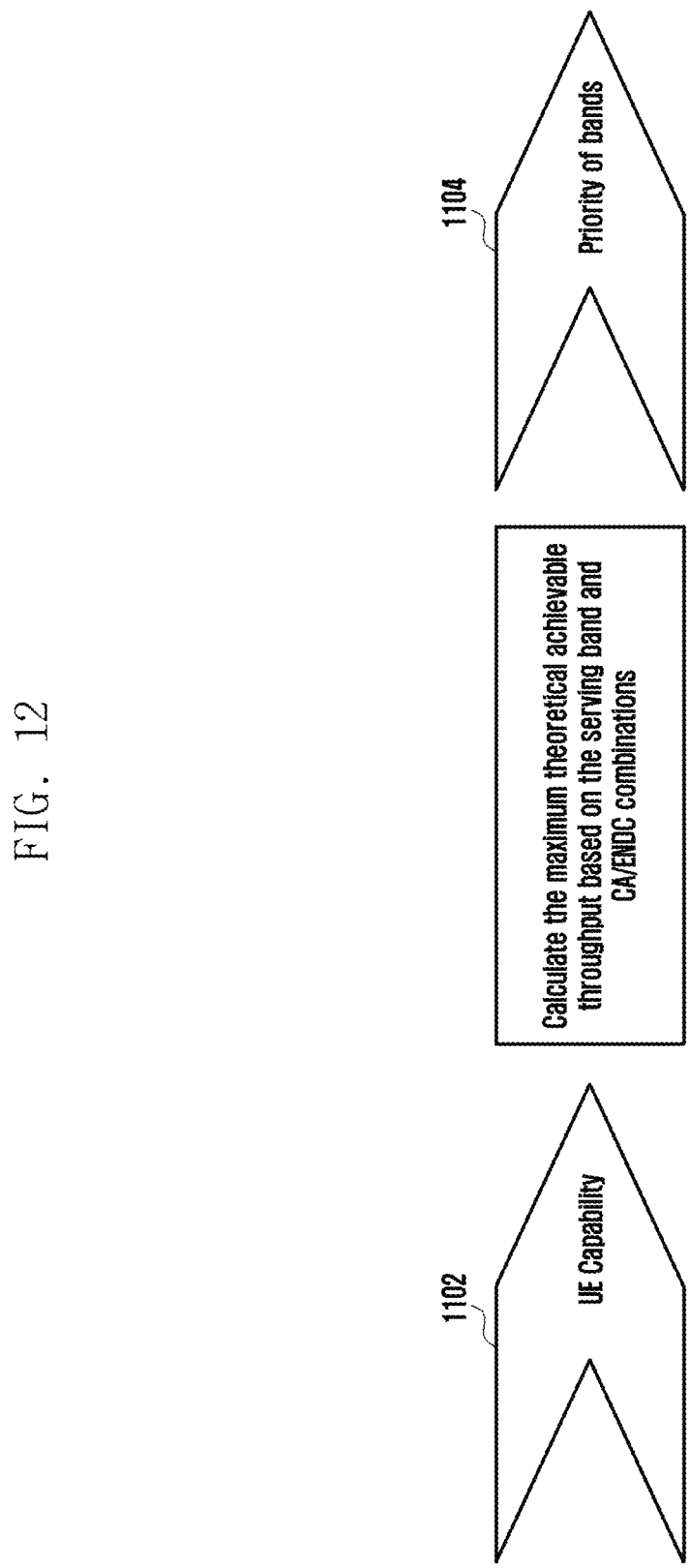
FIG. 12 illustrates a first stage ranking, in accordance with the embodiment of the present disclosure.

FIG. 12 illustrates a first stage ranking. In an example, the ranking of cells based on the device capability comprises determination of a throughput achievable with respect to:

a plurality of bands in respect of the standalone LTE network;

a plurality of bands in respect of the standalone NR network; and at least one LTE band or at least one NR band, said LTE band being either anchor or non-anchor; and a plurality of bands in respect of the Legacy Radio Access network.

In an example, the throughput may be maximum theoretical available with respect to the serving band/ENDC combinations. Thereafter, the bands are ordered based on the determined magnitude of the throughput to create a first ranked list of plurality of bands as a part of the throughput database.

As may be understood, the UE capability is already known to the device. This will be the first stage input given to a model. Based on the capability, device finds out the maximum achievable theoretical throughput that can be achieved if the device camps to a particular band. With respect to each LTE band (anchor and non-anchor), this theoretical maximum throughput achievable by the device will be calculated. Based on the throughput, a priority order of LTE bands will be generated.

For example, the device support Band 2 in LTE, LTE CA 2A 5A and ENDC 2A n5A and both LTE and NR supports 64QAM and 2 layers in downlink (DL). Considering n5 supports only 5 MHz BW, LTE CA 2A 5A will have peak throughput. Considering n5 supports 20 MHz, 2A n5A will have peak throughput as B5 is only 10 mega-Hertz (MHz). If the theoretical maximum is same for an LTE combination an ENDC combination, priority will be given for ENDC combination.

Figure 13A:
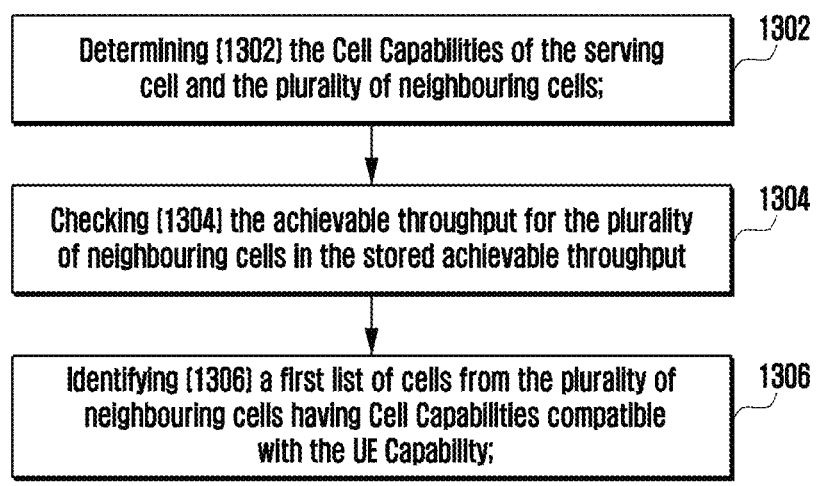
FIGS. 13A and 13B illustrate a second stage ranking, in accordance with the embodiment of the present disclosure.

FIG. 13A illustrates identifying the first list of cells from the plurality of neighboring cells having Cell Capabilities compatible with the UE Capability based on the steps of:

a) determining (1302) the Cell Capabilities of the serving cell and the plurality of neighboring cells;

b) identifying (1304) the first list of cells from the plurality of neighboring cell having Cell Capabilities compatible with the UE Capability; and c) prioritizing (1306) the first list of cells by ranking the first list of cells higher than remaining cells among the plurality of neighboring cells not compatible with the UE Capability.

Figure 13B:
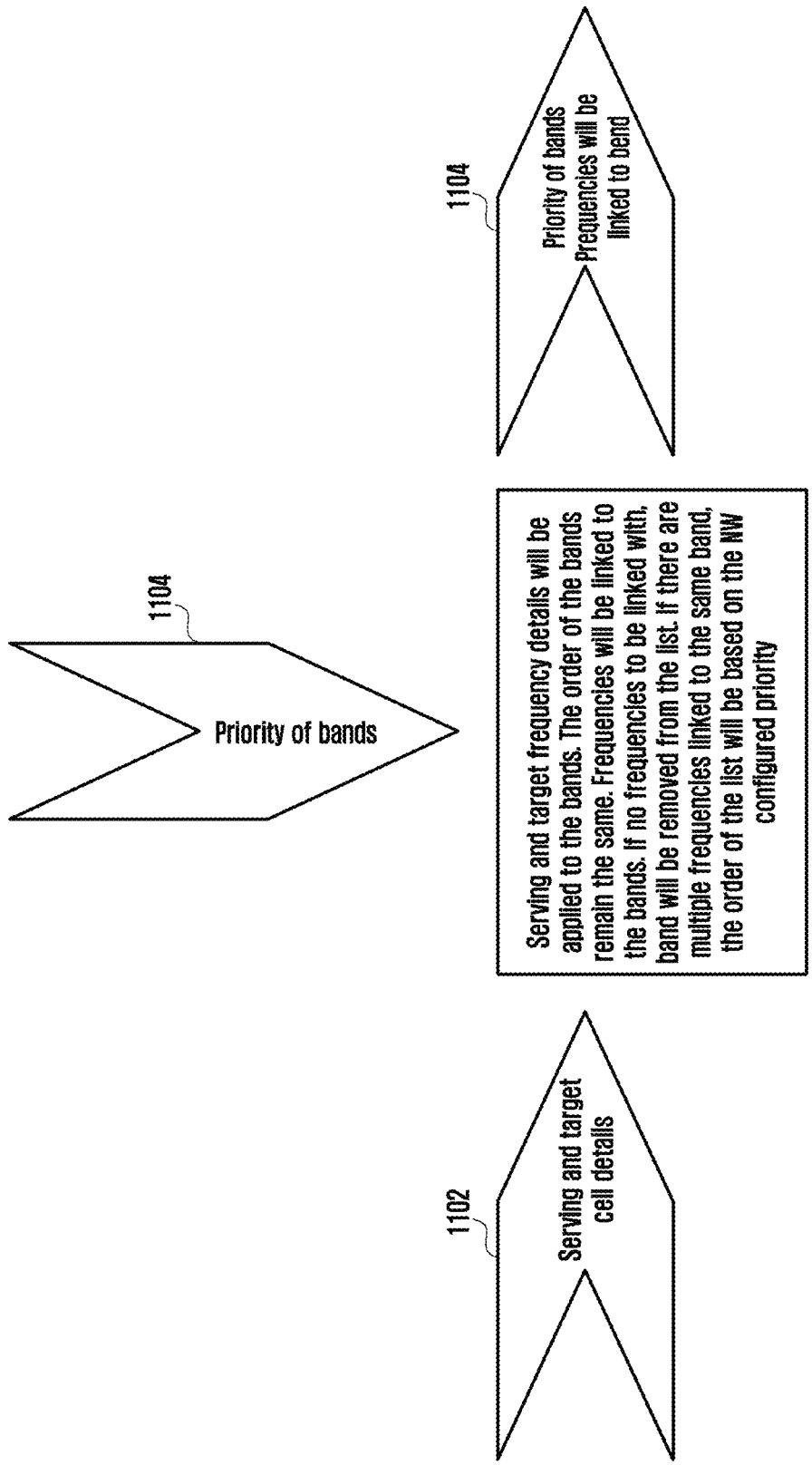

In an example, FIG. 13B illustrates further steps of ranking in line with FIG. 13A. The ranking of cells based on details with respect to one or more serving cells and one or more target-cell comprises receiving current serving cell information and the target-cells configured by a network (NW), and refining the first list based on the received information by removing one or more band not associated with frequency. In case of multiple frequencies linked to the same band, the refined list is reordered based on a NW configured priority to optionally create a second ranked list as a part of the throughput database. A frequency not linked to any band is deleted. In case of multiple frequencies linked to the same band, the frequencies are ordered based on network configuration.

As may be understood, serving and target cell details are applied to the priority list coming after applying the UE capability to create the first list. This is the current serving cell information and the target cells which NW configured. After applying this list to the LTE priority bands (i.e. first list) based on theoretical throughput, the number of bands may get reduced based on the network configuration. Each of the serving and target frequencies will be linked to these bands. After applying this information, the list will be with the band and the frequency information. The order of the list will remain based on the theoretical maximum achievable throughput. If there are multiple frequencies linked to the same band, the order of the list will be based on the NW configured priority.

Figure 14A:
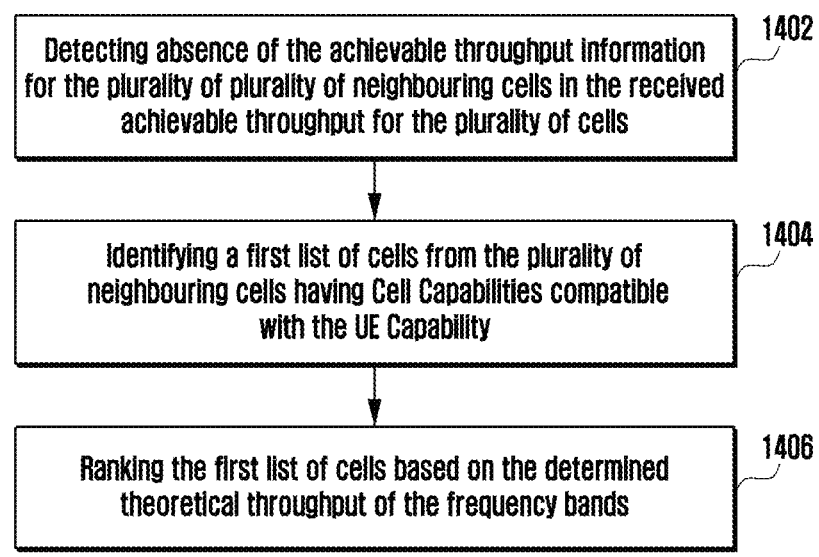

FIG. 14A illustrates the method steps in accordance with an embodiment of the present subject matter. The method comprises:

a) detecting (step 1402) absence of the achievable throughput information for the plurality of plurality of neighboring cells in the received achievable throughput for the plurality of cells connected with the UE over the period of time;

b) identifying (step 1404) a first list of cells from the plurality of neighboring cells having Cell Capabilities compatible with the UE Capability; and c) ranking (step 1406) the first list of cells based on the determined theoretical throughput of the frequency bands wherein the at least one cell from the first list of cells supporting a band having higher theoretical throughput is ranked higher than other cells from the first list of cells.

In an example, FIG. 14B illustrates a further done ranking in line with FIG. 14A. The ranking of cells based on the historical configurations comprises referring a database of the cell details comprising band, frequency, physical cell identifier (PCI) and cell global identifier (CGI). The database is associated with the refined list or the second ranked list as above. A practical-peak data rate for each cell associated with the refined list is created. The first and/or the second list based on the practical peak data rate to create a final ranked list of cells as a part of the throughput database or the on-device database.

As may be understood, the previous configurations are applied to the priority list coming after applying the serving and target cell details. A DB is maintained with the cell details. The cell details include Band, Freq, PCI and CGI (to handle location change) as the basic information. With each cell details, it also maintains the history of the configurations such as LTE CA configured, ENDC configured, effective BW part configured for NR cells, Normal achievable spectral efficiency based on the allocation etc. The above details may be filled to the DB based on the learnings of each cell when that cell acts as the serving cell/Pcell. The DB can be updated periodically with all these details. This DB is used for getting the practical peak throughput numbers that can be achieved in each cell acting as Pcell/Serving cell. After applying this DB to the priority order received, the PCI and CGI will be linked to the band and frequency in the existing list. Then the list will be sorted based on the practical throughput that can be achieved in each cell acting as Pcell.

If there is any frequency in the incoming list without an information in the DB, the throughput numbers based on theoretical maximum will be applicable. As the practical numbers will never be equal to the theoretical numbers, design may choose to set an offset between the theoretical and practical numbers to prioritize the cells. For example, a cell in ENDC combination 2A_n5A is giving a practical achievable throughput of 200 Mbps after applying the DB. Consider there is band 30 in the list which can give a theoretical maximum of 220 Mbps (considering the best supported combination by the device as band 30 cell as Pcell). Device may choose to prioritize band 2 cell over band 30 based on the allowed offset set between the theoretical and practical achievable throughput.

The priority list or third list as generated is used for reselection and measurement reporting. The priority of every cell above the serving cell priority will be considered as higher priority cells. The idle or connected mode mobility corresponds to a selection from LTE to LTE/LTE to NR/NR to LTE/NR to NR/LTE/NR to Legacy RAT/Legacy RAT to LTE/NR.

Figure 15:
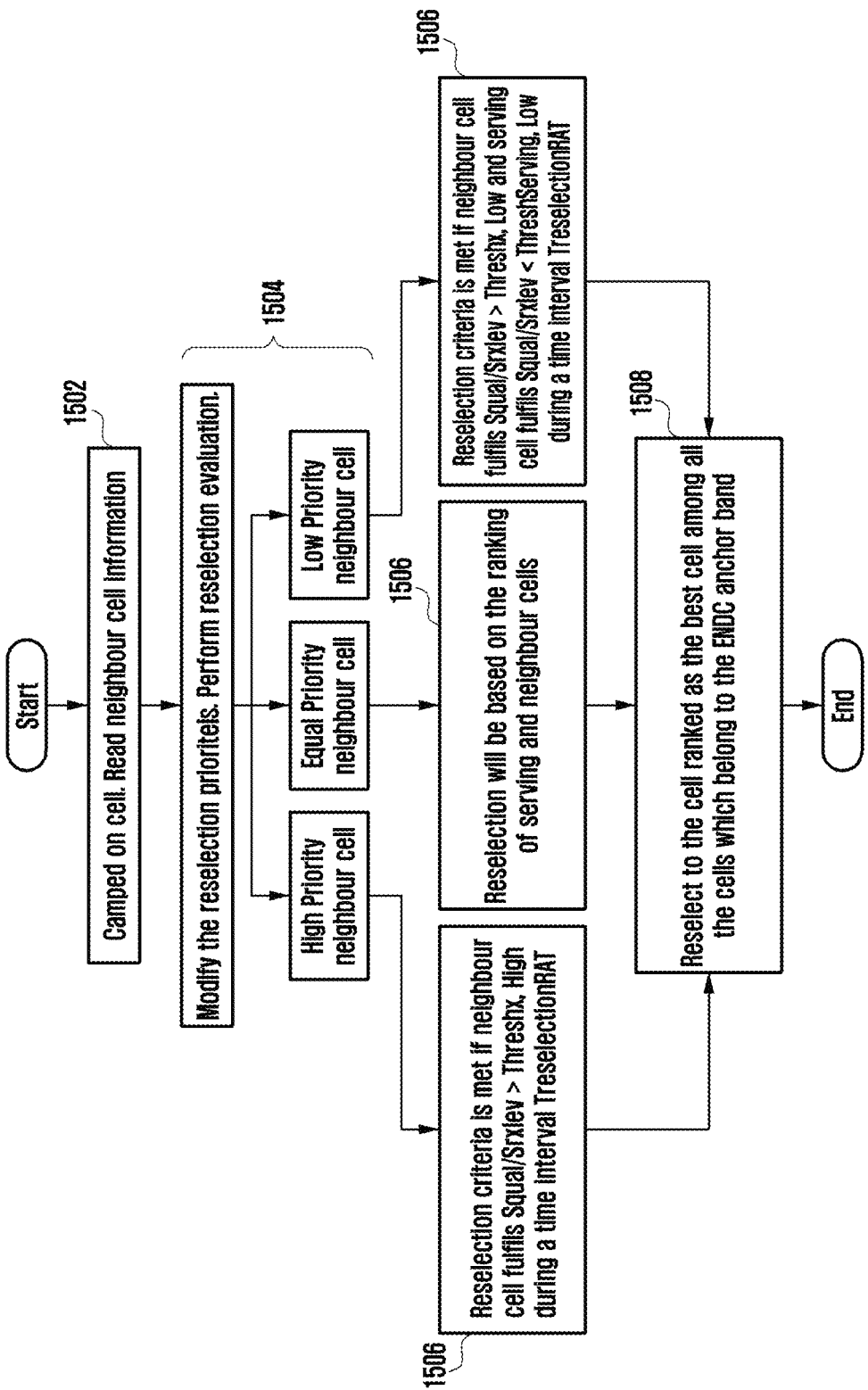
FIG. 15 illustrates method steps, in accordance with the embodiment of the present disclosure.

FIG. 15 illustrates a scenario wherein the criteria is met for multiple cells which belong to ENDC anchor bands and non-ENDC anchor bands and the highest priority cell in the list is selected. In other words, the Cell Reselection is performed when multiple cells meet the criteria at the same time and no ongoing measurements of higher priority cells.

At step 1502, when the device is camped to a cell, the neighbor cell information is read.

At step 1504, the priority of serving and target cells is considered as per the list generated as per the model in FIG. 14.

At step 1506, the evaluation for reselection as reselection criteria of the neighbor cells is performed as per the state of the art criteria.

At step 1508, if multiple cells are meeting the reselection criteria at the same time, reselection is made to the cell which is ranked best among all the cells.

In other words, one or more cells in Standalone/Dual connectivity (DC) configuration adjudicated as primary cells and meeting a selection criteria are selected by the steps of:

Reading (1502) the neighbor cell information when device is camped to a cell;

Analysing (1504) priority of serving and target cells as per the list generated by the determination; and Selecting (1508) the cell which is ranked best among all the cells if multiple cells meet an Idle mode mobility criteria vide step 1506 at the same time.

Figure 16A:
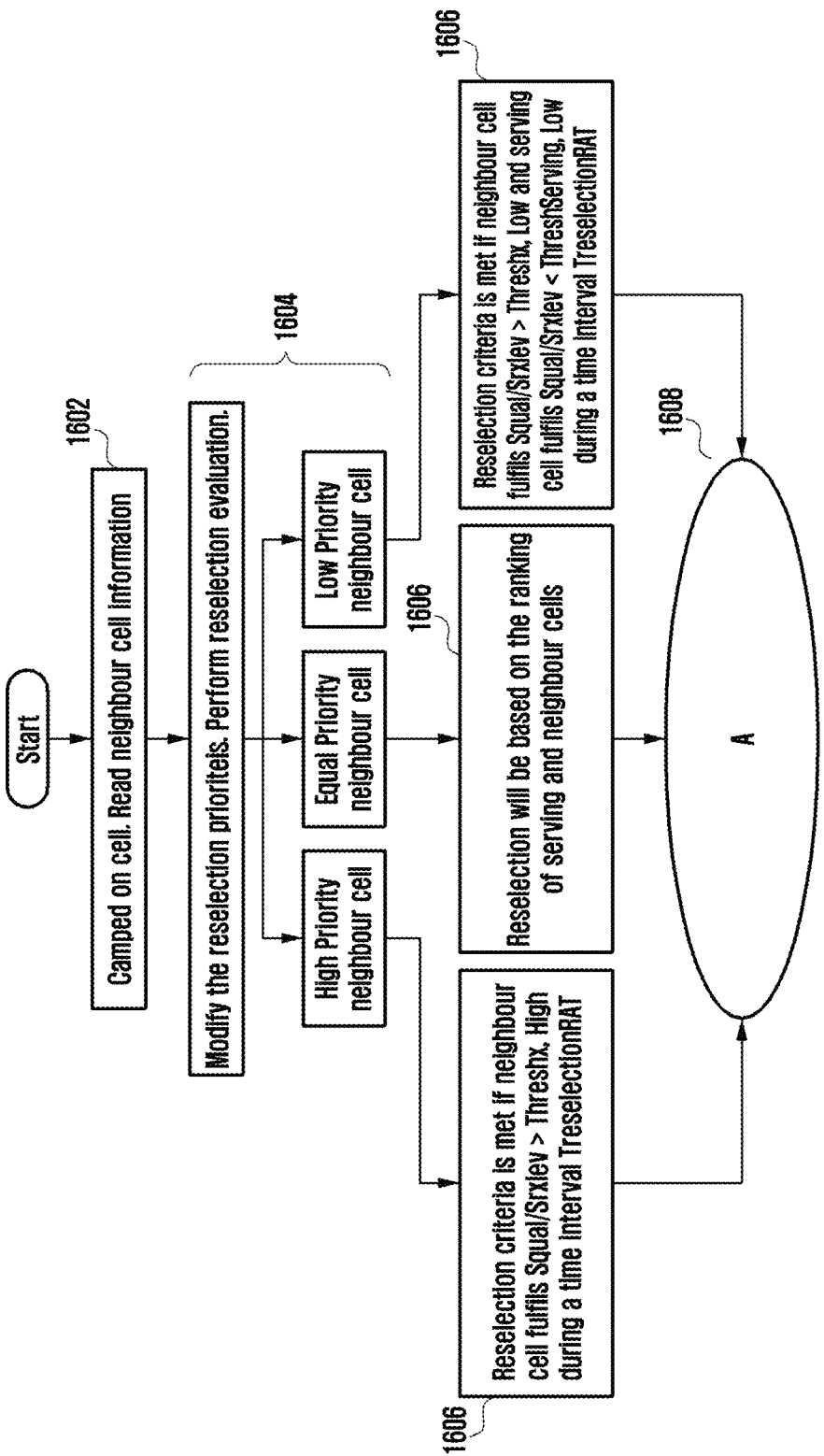
FIGS. 16A and 16B illustrate method steps, in accordance with the embodiment of the present disclosure.
Figure 16B:
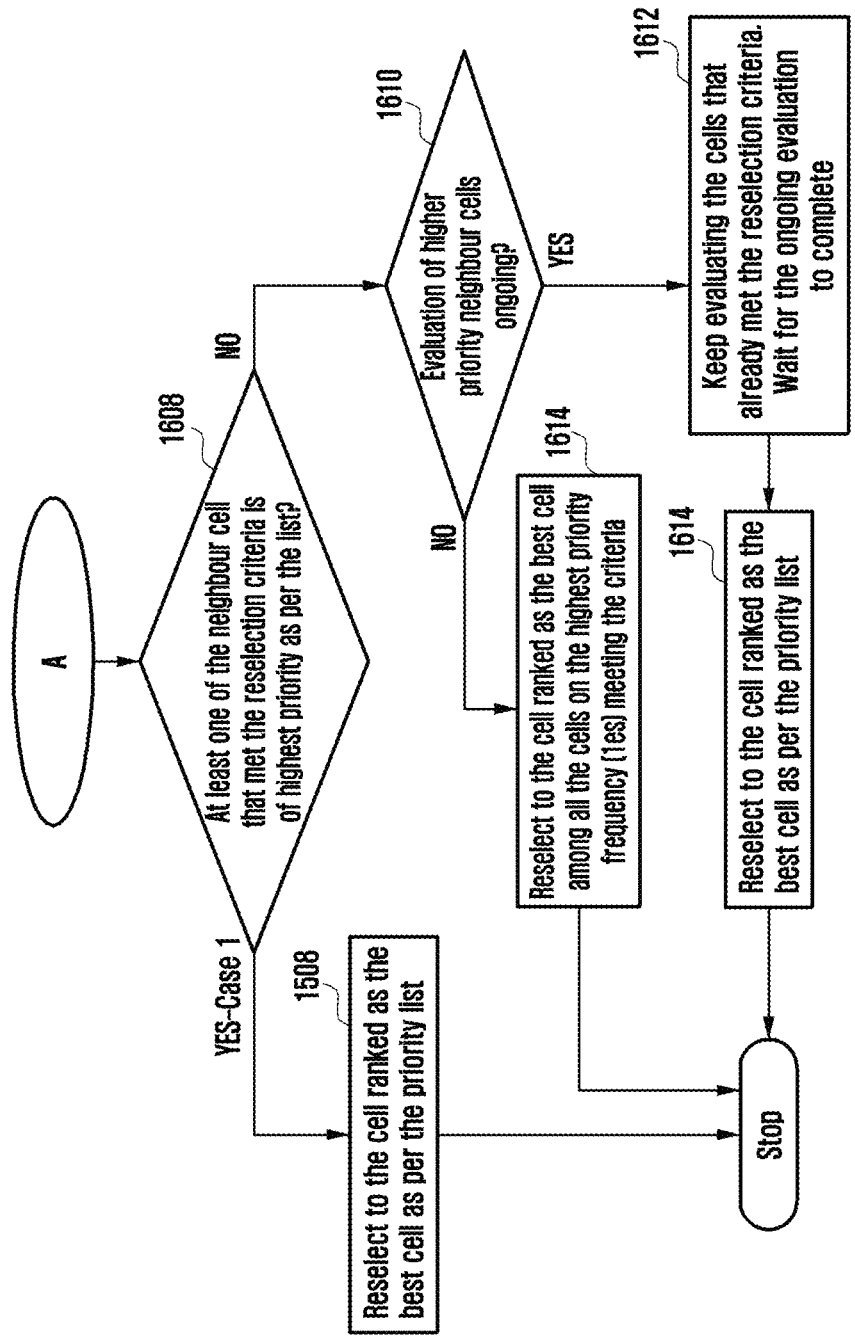

FIGS. 16A and 16B illustrate a scenario of Cell Reselection when multiple cells meet the criteria at the same time and measurements of higher priority cells are ongoing. In other words, one or more cells in Standalone/Dual connectivity (DC) configuration are adjudicated as primary cells and currently undergoing the evaluation criteria are selected for reselection.

At step 1602, when the device is camped to a cell, the neighbor cell information is read.

At step 1604, the priority of serving and target cells is considered as per the list generated as per the model.

At step 1606, the evaluation of the neighbor cells is performed like step 1506.

At step 1608, it is seen if multiple cells are meeting the reselection criteria or idle mode criteria and at the same time and ongoing measurements of higher priority cells are happening such that it is highly probable that these high priority cells will satisfy the reselection criteria. If yes then the control transfers to step 1610. If no ongoing measurements are there, then a process equivalent to step 1508 executes.

At step 1610, it is checked if any of the neighbor cells whose evaluation is ongoing belongs to belongs to higher priority cell as per the list and is a proper candidate to meet the reselection criteria. For example, it could have been determined that lower priority cells are meeting the idle mode mobility criteria and measurements of higher priority cells are underway.

At step 1612, it is determined that if there exists such cells, then the evaluation of those cells which already met the criteria is continued. For all the cells whose evaluation is ongoing, a completion is awaited.

At step 1614, once the evaluation is complete, the reselection criteria is checked for all the cells. Reselection is made to the cell which is ranked best among all the cells.

In another scenario, if the device is not able to successfully reselect to a cell for a certain number of times or for certain duration even after waiting for completing the evaluation of higher priority cells, then device may choose to reselect to cell which are having lower priority if the reselection criteria is still met.

Figure 17:
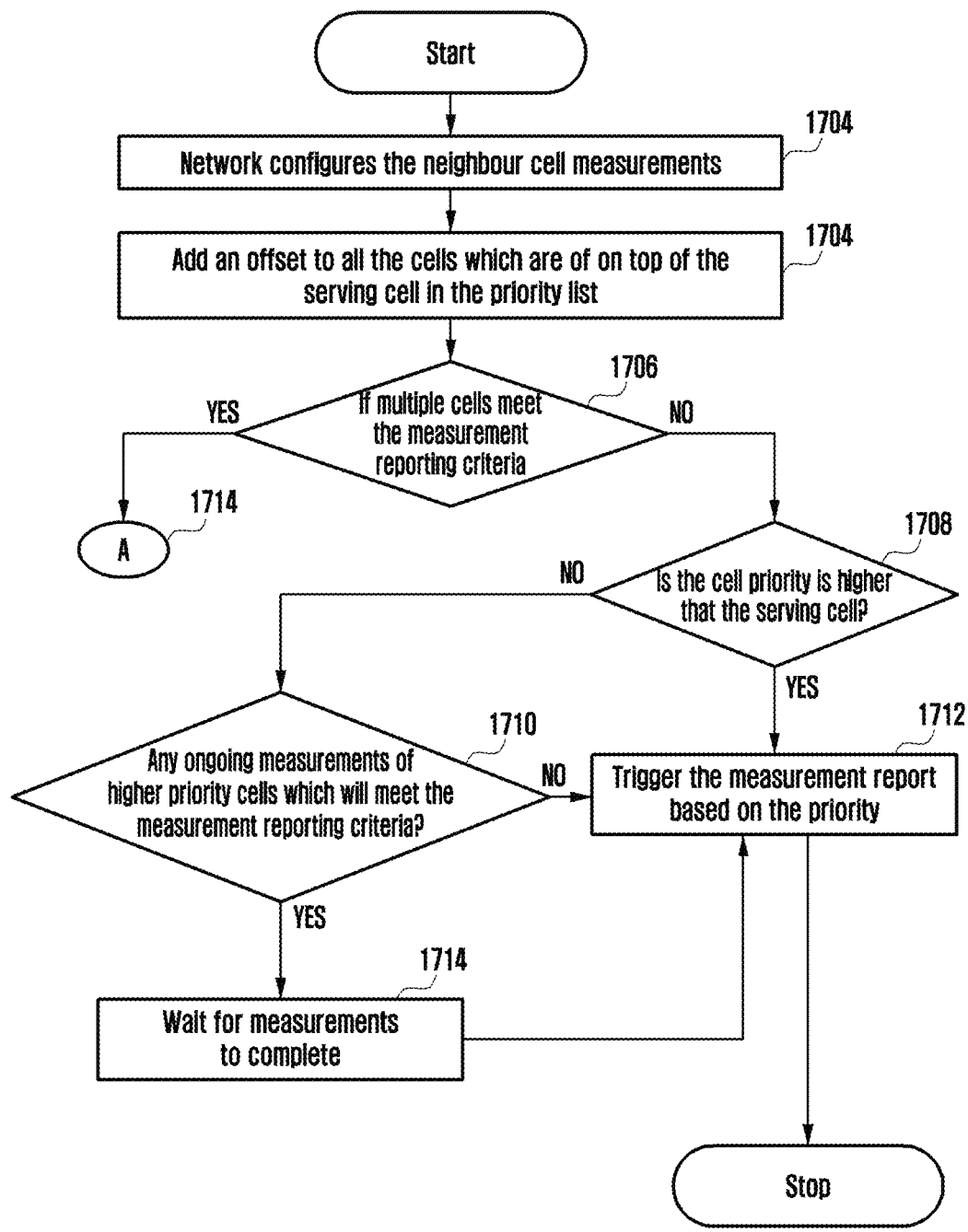
FIG. 17 illustrates method steps, in accordance with the embodiment of the present disclosure.

FIG. 17 illustrates an application of priority-list generated through FIG. 15 for measurement reporting or handover scenario. The same may be based on two prong approach, i.e. Case 1 and Case 2 like FIGS. 16A and 16B.

At step 1702, the network configures neighbour measurements as a part of initiating handover HO.

At step 1704, an offset is added to the measurement configurations for those cells which are having higher priority than the serving cell. This is to prioritize those cells which can achieve higher throughput than the serving cell.

At step 1706, once the criteria is met after modifying the measurement configurations, the report quantity is modified as per the actual measurement configuration and such actual measurement is report to the network via step 1714. However, if the measurement reporting criteria is met for multiple cells the control transfers to step 1708.

At step 1708, it is checked if the cells are with respect to higher priority and if the evaluation for some cells that are of higher priority. If yes, then the control transfers to step 1712. Else the control transfers to step 1710.

At step 1710, it is checked if the evaluation is ongoing for high priority cells assuming that these will satisfy the measurement reporting criteria. In such a case, the control transfers to step 1714. Else, the lower-priority cells meeting the measurement criteria are selected vide step 1712.

At step 1714, the device may choose to wait for the evaluation of these cells to be completed.

At step 1712, the measurement report are sent to the highest priority cell or other cell as may hold applicable. Specifically, if multiple cells meet the reporting criteria, then the measurement reports for those cells which are of highest priority is prioritized. Accordingly, the measurement for those cells are sent first when compared to other cells.

While waiting for the evaluation to be completed, if the serving cells go poor and if the device is in a stage to lose the connection, the device may choose to send the measurement report with the existing evaluated cells despite being lower priority cells.

Figure 18:
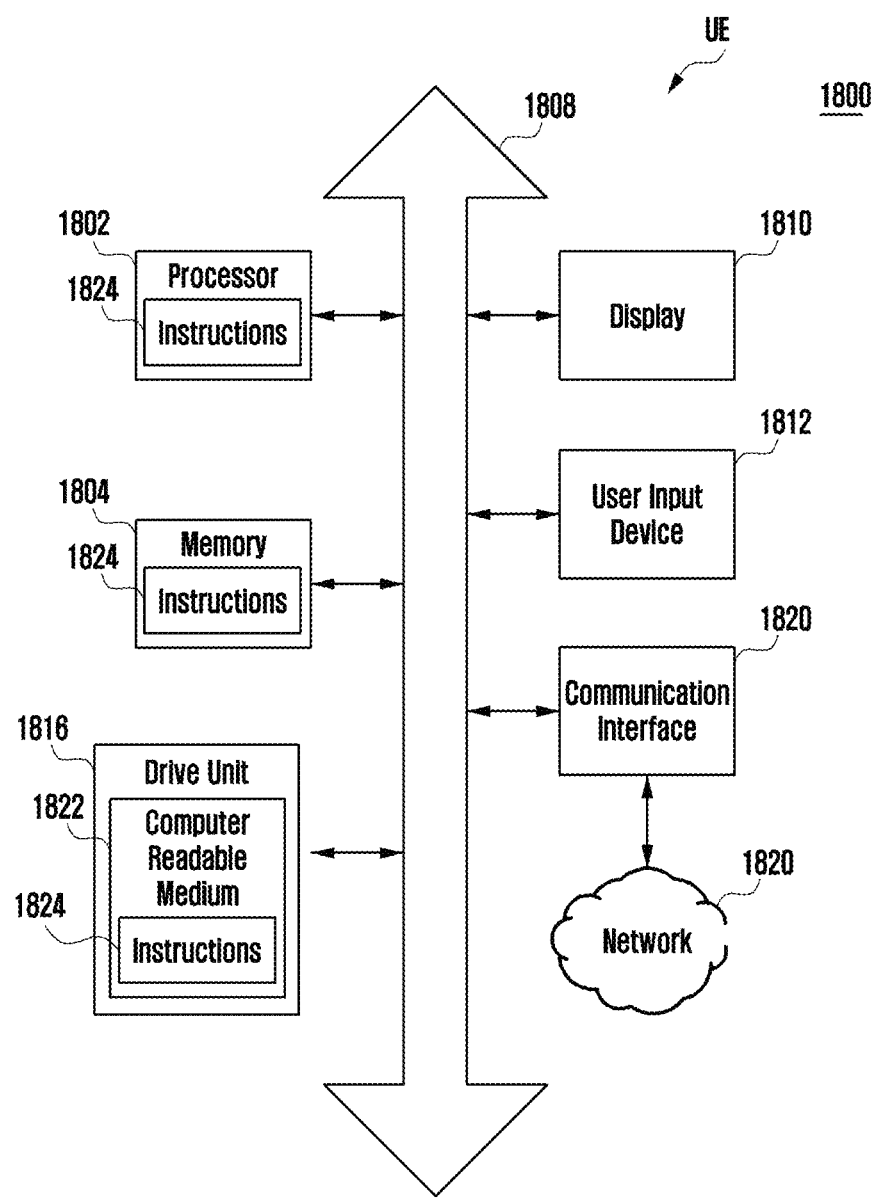
FIG. 18 shows an example computing-device based implementation of the UE, in accordance with the embodiment of the present subject matter.

FIG. 18 shows yet another exemplary implementation in accordance with the embodiment of the present disclosure, and yet another typical hardware configuration of the UE in the form of a computer system 1800. The computer system 1800 can include a set of instructions that can be executed to cause the computer system 1800 to perform any one or more of the methods disclosed. The computer system 1800 may operate as a standalone device or may be connected, e.g., using a network, to other computer systems or peripheral devices.

In a networked deployment, the computer system 1800 may operate in the capacity of a server or as a client user computer in a server-client user network environment, or as a peer computer system in a peer-to-peer (or distributed) network environment. The computer system 1800 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1800 is illustrated, the term "system" shall also be taken to include any collection of systems or sub-systems that individually or jointly execute a set, or multiple sets, of instructions to perform one or more computer functions.

The computer system 1800 may include a processor 1802 e.g., a central processing unit (CPU), a graphics processing unit (GPU), or both. The processor 1802 may be a component in a variety of systems. For example, the processor 1802 may be part of a standard personal computer or a workstation. The processor 1802 may be one or more general processors, digital signal processors, application-specific integrated circuits, field-programmable gate arrays, servers, networks, digital circuits, analog circuits, combinations thereof, or other now known or later developed devices for analysing and processing data. The processor 1802 may implement a software program, such as code generated manually (i.e., programmed).

The computer system 1800 may include a memory 1804, such as a memory 1804 that can communicate via a bus 1808. The memory 1804 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 1804 includes a cache or random access memory for the processor 1802. In alternative examples, the memory 1804 is separate from the processor 1802, such as a cache memory of a processor, the system memory, or other memory. The memory 1804 may be an external storage device or database for storing data. The memory 1804 is operable to store instructions executable by the processor 1802. The functions, acts or tasks illustrated in the figures or described may be performed by the programmed processor 1802 for executing the instructions stored in the memory 1804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1800 may or may not further include a display unit 1810, such as a liquid crystal display (LCD), an organic light-emitting diode (OLED), a flat panel display, a solid-state display, a cathode ray tube (CRT), a projector, a printer or other now known or later developed display device for outputting determined information. The display 1810 may act as an interface for the user to see the functioning of the processor 1802, or specifically as an interface with the software stored in the memory 1804 or in the drive unit 1816.

Additionally, the computer system 1800 may include an input device 1812 configured to allow a user to interact with any of the components of system 1800. The computer system 1800 may also include a disk or optical drive unit 1816. The disk drive unit 1816 may include a computer-readable medium 1822 in which one or more sets of instructions 1824, e.g. software, can be embedded. Further, the instructions 1824 may embody one or more of the methods or logic as described. In a particular example, the instructions 1824 may reside completely, or at least partially, within the memory 1804 or within the processor 1802 during execution by the computer system 1800.

The present disclosure contemplates a computer-readable medium that includes instructions 1824 or receives and executes instructions 1824 responsive to a propagated signal so that a device connected to a network 1826 can communicate voice, video, audio, images or any other data over the network 1826. Further, the instructions 1824 may be transmitted or received over the network 1826 via a communication port or interface 1820 or using a bus 1808. The communication port or interface 1820 may be a part of the processor 1802 or maybe a separate component. The communication port 1820 may be created in software or maybe a physical connection in hardware. The communication port 1820 may be configured to connect with a network 1826, external media, the display 1810, or any other components in system 1800, or combinations thereof. The connection with the network 1826 may be a physical connection, such as a wired Ethernet connection or may be established wirelessly as discussed later. Likewise, the additional connections with other components of the system 1800 may be physical connections or may be established wirelessly. The network 1826 may alternatively be directly connected to the bus 1808.

The network 1826 may include wired networks, wireless networks, Ethernet AVB networks, or combinations thereof. The wireless network may be a cellular telephone network, an 802.11, 802.16, 802.20, 802.1Q or WiMax network. Further, the network 1826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmission (e.g., TCP/IP, UDP/IP, HTML, and HTTP) may be used.

According to various embodiments, A method of cell selection and reselection, comprising: detecting (502) a plurality of neighboring cells and their associated plurality of cell capabilities while the UE, having an associated UE capability, is connected to a serving cell; determining (504) a achievable throughput for the plurality of neighboring cells based on the detected plurality of cell Capability and UE capability; and selecting (506) a first neighboring cell from the plurality of neighboring cells based on the determined achievable throughput.

According to various embodiments, determining the achievable throughput for the plurality of neighboring cells based on the detected plurality of cell capability and UE capability includes: checking a throughput database for the achievable throughput of the plurality of neighboring cells; identifying a first neighboring cell from the plurality of neighboring cells based on at least one of: a highest ranked among the neighboring cells and/or the checked achievable throughput of the plurality of neighboring cells; and sending a request to connect to the first neighboring cell.

According to various embodiments, the throughput database is managed by at least one of the UE, a cloud server and a network entity.

According to various embodiments, managing the throughput database comprises: receiving, over a period of time, achievable throughput of a plurality of cells and associated cell capabilities of the plurality of cells wherein the UE has connected to the plurality of cells over the period of time; storing the received achievable throughput of a plurality of cells and associated cell capabilities of the plurality of cells in a database; and ranking the plurality of cells based on the received throughput, associated cell capabilities and the UE capability.

According to various embodiments, the cell capability includes at least one of Dual Connectivity Configuration, Standalone configuration, supported Carrier Aggregation Configurations, supported Bands, list of frequencies assigned to the supported Bands and supported bandwidth parts.

According to various embodiments, the UE Capability includes at least one of Dual Connectivity Configuration of the UE, Standalone configuration of the UE, Carrier Aggregation Configurations supported by the UE, Frequency Bands supported by the UE, and bandwidth parts supported by the UE.

According to various embodiments, ranking the plurality of serving cells comprises cells defined as at-least one of: one or more cells in Dual connectivity (DC) configuration adjudicated as primary cells and meeting a selection criteria; one or more cells in Dual connectivity (DC) configuration adjudicated as primary cells and current undergoing the selection criteria; one or more bands in respect of NR network defining different-bands in respect of LTE carrier aggregation (CA); one or more bands in respect of standalone NR network; and one or more bands in respect of standalone LTE network.

According to various embodiments, selecting the first neighboring cell comprises pursuing a cell selection process when device is not in camped state or has been redirected by the network, said pursuing defined by the steps of exploring a plurality of cells based on energy detection as a part of cell-selection process; mapping the plurality of explored cells with the cells mentioned in the Throughput Database defining the ranking; and selecting the first neighboring cell based on the mapped cells for cell selection, said mapped cells corresponding to the explored cells defined by one or more frequencies fulfilling a predetermined inequality criteria.

According to various embodiments, the mapping comprises: mapping the plurality of explored-cells linked with one or more detected frequencies with the cells in the throughput database; checking if the one or more detected-frequencies in the are linked or associated to the throughput database; and enabling cell selection in respect of the one or more detected frequencies based on said checking.

According to various embodiments, ranking the plurality of serving cells stored in the Throughput Database comprise: determining (702) a set of bands supported along-with the bandwidth defined by serving cell from the plurality of serving cells; identifying (704, 706) a plurality of CA combinations for the at least one serving cell from the plurality of serving cells; enabling calculation (708) of a achievable throughput with respect to each of said combination based on the bandwidth supported by the device; updating (804) the achievable throughput for each combination based on the bandwidth and CA configuration deployed by the network when the device camps on cell; and updating (806) a ranking associated with the throughput database based on said updated achievable data rate.

According to various embodiments, the plurality of serving cells are defined by at least one of LTE, NR, MRDC, NRDC and Legacy Radio access networks.

According to various embodiments, the identification of plurality of CA combinations is performed based on bandwidth & frequency of the at least one serving cell from the plurality of serving cells, the bandwidths being defined by the LTE, NR, MRDC, NRDC and Legacy Radio access networks.

According to various embodiments, an achievable data rate forming a part of the achievable throughput for each combination is updated upon camping on a serving cell based on: recalculating the bandwidth and number of layers associated with one or more of the LTE, NR, MRDC, NRDC for each combination and in respect of the actual bandwidth and CA configuration which the network has deployed in respect of the current camped cell; and updating the ranking based on said updated achievable data rate.

According to various embodiments, pursuing a cell selection process when device is not in camped state or redirected by the network, said pursuing defined by the steps of exploring a plurality of cells based on energy detection as a part of cell-selection process; mapping the plurality of explored cells with the cells mentioned in the throughput database; and pursuing cell selection based on the mapped cells for cell selection, said mapped cell corresponding to the explored cells defining one or more frequencies fulfilling a predetermined inequality criteria.

According to various embodiments, the mapping comprises: mapping the plurality of explored-cells linked with one or more detected frequencies with the cells in the throughput database; checking if the one or more detected-frequencies in the are linked or associated to the throughput database; enabling cell selection in respect of the one or more detected frequencies based on said checking.

According to various embodiments, said ranking the plurality of neighboring cells comprises at-least one of: determining (1102*a*) a theoretical throughput for a plurality of frequency bands supported by the UE Capability; checking (1102*b*) the achievable throughput for the plurality of neighboring cells in the stored achievable throughput of the plurality of cell in the Throughput Database; identifying (1102c) a first list of cells from the plurality of neighboring cells having Cell Capabilities compatible with the UE Capability; and Ranking (1104) the first list of cells based on the checked achievable throughput.

According to various embodiments, at least one neighboring cell compatible with the UE capability and having higher achievable throughput is ranked higher than the other cells from the plurality of neighboring cells compatible with UE capability and having lower achievable throughput.

According to various embodiments, identifying the first list of cells from the plurality of neighboring cells having cell capabilities compatible with the UE capability comprises determining (1302) the cell capabilities of the serving cell and the plurality of neighboring cells; identifying (1304) the first list of cells from the plurality of neighboring cell having cell capabilities compatible with the UE capability; and prioritizing (1306) the first list of cells by ranking the first list of cells higher than remaining cells among the plurality of neighboring cells not compatible with the UE capability.

According to various embodiments, detecting (1402) absence of the achievable throughput information for the plurality of plurality of neighboring cells in the received achievable throughput for the plurality of cells connected with the UE over the period of time; identifying (1404) a first list of cells from the plurality of neighboring cells having Cell Capabilities compatible with the UE Capability; ranking (1404) the first list of cells based on the determined theoretical throughput of the frequency bands wherein the at least one cell from the first list of cells supporting a band having higher theoretical throughput is ranked higher than other cells from the first list of cells.

According to various embodiments, one or more cells in Standalone/Dual connectivity (DC) configuration adjudicated as primary cells and meeting a selection criteria are selected by the steps of: reading the neighbor cell information when device is camped to a cell; analyzing priority of serving and target cells in accordance with the first list of cells in the throughput database; and selecting the cell which is ranked best among all the cells if multiple cells meet an Idle mode or connected mode mobility criteria at the same time.

According to various embodiments, one or more cells in Standalone/Dual connectivity (DC) configuration adjudicated as primary cells and currently undergoing the selection criteria are selected by the steps of: reading the neighbor cell information when device is camped to a cell; analyzing priority of serving and target cells as per the first list of cells of the throughput database; selecting the cell which is ranked best among all the cells if multiple cells meet a idle or connected mode mobility criteria at the same time; determining if lower priority cells are meeting the idle or connected mode mobility criteria and measurements of higher priority cells are underway; based on the determining of meeting criteria, checking if any of the neighbor-cells undergoing evaluation belong to a higher priority cell as per the determined ranking and predicted to fulfill the reselection criteria; awaiting a completion of evaluation for all cells; and selecting the cell which is ranked best among all the cells.

According to various embodiments, selecting the cell having lower priority in case of an unsuccessful selection of the higher priority cell despite awaiting completion of the evaluation of higher priority cells.

According to various embodiments, the idle or connected mode mobility corresponds to a selection from LTE to LTE/LTE to NR/NR to LTE/NR to NR/LTE/NR to Legacy RAT/Legacy RAT to LTE/NR.

According to various embodiments, a user-equipment (UE) to select cells in various modes of operation, the UE comprising: a transceiver; a memory; a processor configured for detecting a plurality of neighboring cells and their associated plurality of cell capabilities while the UE, having an associated UE capability, is connected to a serving cell; determining a achievable throughput for the plurality of neighboring cells based on the detected plurality of cell Capability and UE capability; and selecting a first neighboring cell from the plurality of neighboring cells based on the determined achievable throughput.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A method of cell selection and reselection, the method comprising:
    detecting a plurality of neighboring cells related to one or more detected frequencies, and their associated respective cell capabilities related to achievable throughput while a user equipment (UE), having an associated UE capability related to achievable throughput, is connected to a serving cell;
    identifying a throughput database for the achievable throughput of the plurality of neighboring cells based on the detected cell capabilities and UE capability;
    selecting a first neighboring cell from the plurality of neighboring cells based on at least one of: a highest ranked among the neighboring cells or the identified achievable throughput of the plurality of neighboring cells; and
    sending a request to connect to the first neighboring cell.

2. The method of claim 1, wherein the throughput database is managed by at least one of the UE, a cloud server and a network entity.

3. The method of claim 2, wherein managing the throughput database comprises:
receiving, over a period of time, achievable throughput of a plurality of cells and associated cell capabilities of the plurality of cells, wherein the UE has connected to the plurality of cells over the period of time;
storing the received achievable throughput of the plurality of cells and associated cell capabilities of the plurality of cells in a database; and
ranking the plurality of cells based on the received achievable throughput, associated cell capabilities and the UE capability.

4. The method as claimed in claim 3, wherein ranking the plurality of cells stored in the throughput database comprise:
determining a set of bands supported along with a bandwidth defined by the serving cell from the plurality of cells;
identifying a plurality of CA combinations for the at least one serving cell from the plurality of cells;
enabling calculation of an achievable throughput with respect to each of the CA combinations based on the bandwidth supported by the UE;
updating the achievable throughput for each combination based on the bandwidth and CA configuration deployed by the network when the UE camps on cell; and
updating a ranking associated with the throughput database based on the updated achievable throughput.

5. The method as claimed in claim 4, further comprising pursuing a cell selection process when device is not in camped state or redirected by the network, the pursuing defined by the steps of
exploring a plurality of cells based on energy detection as a part of a cell-selection process;
mapping the plurality of explored cells with the cells mentioned in the throughput database; and
pursuing cell selection based on the mapped cells for cell selection, the mapped cells corresponding to the plurality of explored cells defining one or more frequencies fulfilling a predetermined inequality criteria.

6. The method as claimed in claim 5, wherein the mapping comprises:
mapping the plurality of explored cells linked with one or more detected frequencies with the cells in the throughput database;
checking if the one or more detected frequencies are linked or associated to the throughput database; and
enabling cell selection in respect of the one or more detected frequencies based on the checking.

7. The method of claim 3, wherein the ranking the plurality of neighboring cells comprises at least one of:
determining a theoretical throughput for a plurality of frequency bands supported by the UE capability;
checking the achievable throughput for the plurality of neighboring cells in the stored achievable throughput of the plurality of cells in the throughput database;
identifying a first list of cells from the plurality of neighboring cells having cell capabilities compatible with the UE capability; and
ranking the first list of cells based on the checked achievable throughput.

8. The method as claimed in claim 7, wherein identifying the first list of cells from the plurality of neighboring cells having cell capabilities compatible with the UE capability comprises
determining the cell capabilities of the serving cell and the plurality of neighboring cells;
identifying the first list of cells from the plurality of neighboring cell having cell capabilities compatible with the UE capability; and
prioritizing the first list of cells by ranking the first list of cells higher than remaining cells among the plurality of neighboring cells not compatible with the UE capability.

9. The method as claimed in claim 7, further comprises:
detecting an absence of achievable throughput information for the plurality of plurality of neighboring cells in the received achievable throughput for the plurality of cells connected with the UE over the period of time;
identifying a first list of cells from the plurality of neighboring cells having cell capabilities compatible with the UE capability; and
ranking the first list of cells based on the determined theoretical throughput of the frequency bands, wherein at least one cell from the first list of cells supporting a band having higher theoretical throughput is ranked higher than other cells from the first list of cells.

10. A user-equipment (UE) to select cells in various modes of operation, the UE comprising:
a transceiver,
a memory, and
a processor configured to:
detect a plurality of neighboring cells related to one or more detected frequencies, and their associated respective cell capabilities related to achievable throughput while the UE, having an associated UE capability related to achievable throughput, is connected to a serving cell,
identify a throughput database for the achievable throughput of the plurality of neighboring cells based on the detected cell capabilities and UE capability,
select a first neighboring cell from the plurality of neighboring cells based on at least one of: a highest ranked among the neighboring cells or the identified achievable throughput of the plurality of neighboring cells, and
send a request to connect to the first neighboring cell.

11. The UE of claim 10, wherein the throughput database is managed by at least one of the UE, a cloud server and a network entity.

12. The UE of claim 11, wherein management of the throughput database comprises:
receipt, over a period of time, of achievable throughput of a plurality of cells and associated cell capabilities of the plurality of cells, wherein the UE has connected to the plurality of cells over the period of time;
storage of the received achievable throughput of the plurality of cells and associated cell capabilities of the plurality of cells in a database; and
ranking of the plurality of cells based on the received achievable throughput, associated cell capabilities and the UE capability.

13. The UE as claimed in claim 12, wherein ranking of the plurality of cells stored in the throughput database comprises:
determination of a set of bands supported along with a bandwidth defined by the serving cell from the plurality of cells;
identification of a plurality of carrier aggregation (CA) combinations for at least one cell from the plurality of cells;
enablement of calculation of an achievable throughput with respect to each of the CA combinations based on the bandwidth supported by the UE;

update of the achievable throughput for each combination based on the bandwidth and CA configuration deployed by the network when the UE camps on cell; and update of a ranking associated with the throughput database based on the updated achievable throughput.

14. The UE as claimed in claim 13, wherein the processor is further configured to pursue a cell selection process when device is not in camped state or redirected by the network, and to pursue the cell selection process the processor is configured to:

explore a plurality of cells based on energy detection as a part of cell-selection process;

map the plurality of explored cells with the cells mentioned in the throughput database; and pursue cell selection based on the mapped cells for cell selection, the mapped cells corresponding to the plurality of explored cells defining one or more frequencies fulfilling a predetermined inequality criteria.

15. The UE as claimed in claim 14, wherein to map, the processor is further configured to:

map the plurality of explored cells linked with one or more detected frequencies with the cells in the throughput database;

check if the one or more detected frequencies are linked or associated to the throughput database; and enable cell selection in respect of the one or more detected frequencies based on said checking.

16. The UE of claim 12, wherein to rank the plurality of neighboring cells, the processor is configured to:

determine a theoretical throughput for a plurality of frequency bands supported by the UE capability;

check the achievable throughput for the plurality of neighboring cells in the stored achievable throughput of the plurality of cells in the throughput database;

identify a first list of cells from the plurality of neighboring cells having cell capabilities compatible with the UE capability; and rank the first list of cells based on the checked achievable throughput.

17. The UE as claimed in claim 16, wherein to identify the first list of cells from the plurality of neighboring cells having cell capabilities compatible with the UE capability, the processor is configured to:

determine the cell capabilities of the serving cell and the plurality of neighboring cells;

identify the first list of cells from the plurality of neighboring cells having cell capabilities compatible with the UE capability; and prioritize the first list of cells by ranking the first list of cells higher than remaining cells among the plurality of neighboring cells not compatible with the UE capability.

18. The UE as claimed in claim 16, wherein the processor is further configured to:

detect an absence of achievable throughput information for the plurality of neighboring cells in the received achievable throughput for the plurality of cells connected with the UE over the period of time;

identify a first list of cells from the plurality of neighboring cells having cell capabilities compatible with the UE capability; and rank the first list of cells based on the determined theoretical throughput of the frequency bands, wherein at least one cell from the first list of cells supporting a band having higher theoretical throughput is ranked higher than other cells from the first list of cells.

* * * * *